(12) United States Patent
Lindell et al.

(10) Patent No.: US 12,207,758 B2
(45) Date of Patent: Jan. 28, 2025

(54) MULTIFUNCTION TOASTER OVEN

(71) Applicant: CONAIR LLC, Stamford, CT (US)

(72) Inventors: Kyle Erik Lindell, Fairfield, CT (US); Scott Leclerc, Ashby, MA (US); James Sandor, Trumbull, CT (US)

(73) Assignee: Conair LLC, Stamford, CT (US)

( * ) Notice: Subject to any disclaimer, the term of this patent is extended or adjusted under 35 U.S.C. 154(b) by 162 days.

(21) Appl. No.: 17/350,265

(22) Filed: Jun. 17, 2021

(65) Prior Publication Data

US 2022/0400895 A1 Dec. 22, 2022

(51) Int. Cl.
*A47J 37/06* (2006.01)
*F24C 15/32* (2006.01)

(52) U.S. Cl.
CPC ......... *A47J 37/0641* (2013.01); *F24C 15/325* (2013.01)

(58) Field of Classification Search
CPC ..... A47J 37/0641; F24C 15/325; F24C 15/16; F24C 15/168
USPC .......... 126/332, 337 R, 338, 337 A
See application file for complete search history.

(56) References Cited

U.S. PATENT DOCUMENTS

| | | | |
|---|---|---|---|
| 4,829,158 A * | 5/1989 | Burnham | F24C 15/325 219/400 |
| 6,073,458 A * | 6/2000 | Kim | F25D 17/045 62/255 |
| 6,342,004 B1 * | 1/2002 | Lattimore | A62C 2/245 169/48 |
| 6,732,637 B2 | 5/2004 | Artt | |
| 6,854,456 B1 | 2/2005 | Friedrich et al. | |
| 6,854,457 B2 | 2/2005 | Rabas et al. | |
| 7,183,520 B2 * | 2/2007 | Park | H05B 6/642 219/394 |
| 7,836,874 B2 | 11/2010 | Mcfadden | |
| 8,006,685 B2 | 8/2011 | Bolton et al. | |
| 8,035,062 B2 | 10/2011 | Mcfadden et al. | |
| 8,991,383 B2 | 3/2015 | Mcfadden et al. | |
| 9,022,496 B2 * | 5/2015 | Armstrong | F24C 15/16 312/410 |
| 9,109,804 B2 * | 8/2015 | Armstrong | A47B 57/08 |
| 9,677,774 B2 * | 6/2017 | McKee | F24C 15/166 |
| 2006/0240761 A1 * | 10/2006 | Yamaguchi | A47F 3/001 454/184 |
| 2006/0240765 A1 * | 10/2006 | Cheng | F24F 13/12 454/334 |

(Continued)

FOREIGN PATENT DOCUMENTS

DE 102010063847 A1 6/2012

*Primary Examiner* — Helena Kosanovic
*Assistant Examiner* — Thao Uyen Tran-Le
(74) *Attorney, Agent, or Firm* — Grogan, Tuccillo & Vanderleeden, LLP

(57) ABSTRACT

A toaster oven includes a housing having an internal heating compartment, at least one heating element within the internal heating compartment, a vent associated with at least one wall of the internal heating compartment, the vent being moveable between an open position where air is permitted to pass into the internal heating compartment through the vent, and a closed position where passage of air into the internal heating compartment through the vent is inhibited. The vent is configured to move from the closed position to the open position in response to a biasing force exerted by a food support tray received within the internal heating compartment.

14 Claims, 39 Drawing Sheets

(56) References Cited

U.S. PATENT DOCUMENTS

| | | | |
|---|---|---|---|
| 2006/0289435 A1* | 12/2006 | Park | H05B 6/6426 |
| | | | 219/394 |
| 2008/0105249 A1 | 5/2008 | Mcfadden et al. | |
| 2009/0090347 A1* | 4/2009 | Kim | F24C 15/325 |
| | | | 426/523 |
| 2013/0175253 A1* | 7/2013 | Shei | A47J 39/003 |
| | | | 219/400 |
| 2018/0213802 A1* | 8/2018 | Reinhard-Herrscher | |
| | | | H05B 6/6408 |
| 2022/0170646 A1* | 6/2022 | Bianchi | F24C 15/327 |

* cited by examiner

MULTIFUNCTION TOASTER OVEN

FIELD OF THE INVENTION

The present invention relates to toaster ovens and, more particularly, to a multifunction toaster oven that is selectively operable in a variety of modes.

BACKGROUND OF THE INVENTION

Various toaster ovens exist for heating and cooking a variety of food items. For example, existing toaster ovens are used for toasting bagels, heating sandwiches, baking desserts, broiling meats and reheating leftovers. Heating and cooking these food items is often accomplished by the operation of upper and lower heating elements within the toaster oven, and temperature control and time control over these heating elements through a user interface or control panel.

While existing toaster ovens are generally suitable for what is regarded as ordinary performance, there is room for improvement in terms of ease of use, performance, cooking capacity and cleanability.

SUMMARY OF THE INVENTION

It is an object of the present invention to provide a multifunction toaster oven.

It is another object of the present invention to provide a multifunction toaster oven that is capable of baking, broiling toasting and air frying food items.

It is another object of the present invention to provide a multifunction toaster oven that has an increased cooking capacity.

It is another object of the present invention to provide a multifunction toaster oven that is easy to clean.

These and other objects are achieved by the present invention.

According to an embodiment of the present invention, a toaster oven is provided. The toaster oven includes a housing having an internal heating compartment, at least one heating element within the internal heating compartment, a vent associated with at least one wall of the internal heating compartment, the vent being moveable between an open position where air is permitted to pass into the internal heating compartment through the vent, and a closed position where passage of air into the internal heating compartment through the vent is inhibited. The vent is configured to move from the closed position to the open position in response to a biasing force exerted by a food support tray received within the internal heating compartment.

According to another embodiment of the invention, a method of operating a toaster oven is provided. The method includes the steps of inserting a food support tray into an internal heating compartment of the toaster oven, the internal heating compartment having at least one heating element therein, and moving a side vent associated with a sidewall of the internal heating compartment from a closed position where passage of air into the internal heating compartment through the side vent is inhibited, to an open position where air is permitted to pass into the internal heating compartment through the side vent, wherein moving the side vent to the open position is effected by mechanical interaction between the food support tray and the side vent during insertion of the food support tray into the internal heating compartment.

According to another embodiment of the present invention, a toaster oven is provided. The toaster oven includes a housing having an internal heating compartment having at least a rear wall and opposed sidewalls, at least one heating element within the internal heating compartment, and a vent associated with at least one of the sidewalls of the internal heating compartment, the vent being moveable between an open position where air is permitted to pass into the internal heating compartment through the vent, and a closed position where passage of air into the internal heating compartment through the vent is inhibited. The vent is configured to move from the closed position to the open position in response to a biasing force exerted by a food support tray received within the internal heating compartment, and to move from the open position to the closed position automatically in response to the food support tray being removed from the internal heating compartment.

According to another embodiment of the present invention, a toaster oven is provided. The toaster oven includes a housing having an internal heating compartment, at least one heating element within the internal heating compartment, and a vent associated with a rear wall of the internal heating compartment, the vent being moveable between an open position where air is permitted to pass into the internal heating compartment through the vent, and a closed position where passage of air into the internal heating compartment through the vent is inhibited. The vent is configured to move from the closed position to the open position in response to a biasing force exerted by a food support tray received within the internal heating compartment.

According to another embodiment of the present invention, a method of operating a toaster oven is provided. The method includes the steps of inserting a food support tray into an internal heating compartment of the toaster oven, the internal heating compartment having at least one heating element therein, and moving a rear vent associated with a rear wall of the internal heating compartment from a closed position where passage of air into the internal heating compartment through the rear vent is inhibited, to an open position where air is permitted to pass into the internal heating compartment through the rear vent, wherein moving the rear vent to the open position is effected by mechanical interaction between the food support tray and the rear vent during insertion of the food support tray into the internal heating compartment.

According to yet another embodiment of the present invention, a toaster oven includes a housing having an internal heating compartment having at least a rear wall and opposed sidewalls, at least one heating element within the internal heating compartment, and a vent associated with the rear wall of the internal heating compartment, the vent being moveable between an open position where air is permitted to pass into the internal heating compartment through the vent, and a closed position where passage of air into the internal heating compartment through the vent is inhibited. The vent is configured to move from the closed position to the open position in response to a biasing force exerted by a food support tray received within the internal heating compartment, and to move from the open position to the closed position automatically in response to the food support tray being removed from the internal heating compartment.

According to yet another embodiment of the present invention, a toaster oven includes a housing having an internal heating compartment having at least a rear wall and opposed sidewalls, at least one heating element within the internal heating compartment, a side vent associated with at least one of the sidewalls of the internal heating compartment, the side vent being moveable between an open position where air from a side air plenum is permitted to pass into the internal heating compartment through the side vent, and a closed position where passage of air into the internal heating compartment through the side vent is inhibited, and a rear vent associated with the rear wall of the internal heating compartment, the rear vent being moveable between an open position where air from a rear air plenum is permitted to pass into the internal heating compartment through the rear vent, and a closed position where passage of air into the internal heating compartment through the vent is inhibited.

According to yet another embodiment of the present invention a method of operating a toaster oven includes the steps of inserting a food support tray into an internal heating compartment of the toaster oven, the internal heating compartment having at least one heating element therein, moving a side vent associated with a sidewall of the internal heating compartment from a closed position where passage of air into the internal heating compartment through the side vent is inhibited, to an open position where air is permitted to pass into the internal heating compartment through the side vent, and moving a rear vent associated with a rear wall of the internal heating compartment from a closed position where passage of air into the internal heating compartment through the rear vent is inhibited, to an open position where air is permitted to pass into the internal heating compartment through the rear vent, wherein moving the side vent to the open position is effected by mechanical interaction between the food support tray and the side vent during insertion of the food support tray into the internal heating compartment, and wherein moving the rear vent to the open position is effected by mechanical interaction between the food support tray and the rear vent during insertion of the food support tray into the internal heating compartment.

According to yet another embodiment of the present invention a toaster oven includes a housing having an internal heating compartment having at least a rear wall and opposed sidewalls, at least one heating element within the internal heating compartment, a side vent associated with at least one of the sidewalls of the internal heating compartment, the side vent being moveable between an open position where air from a side air plenum is permitted to pass into the internal heating compartment through the side vent, and a closed position where passage of air into the internal heating compartment through the side vent is inhibited, and a rear vent associated with the rear wall of the internal heating compartment, the rear vent being moveable between an open position where air from a rear air plenum is permitted to pass into the internal heating compartment through the rear vent, and a closed position where passage of air into the internal heating compartment through the vent is inhibited. The side vent and the rear vent are configured to move from the respective closed positions to the respective open positions in response to a biasing force exerted by a food support tray received within the internal heating compartment. The side vent and the rear vent are also configured to move from the respective open positions to the respective closed positions automatically in response to the food support tray being removed from the internal heating compartment.

According to yet another embodiment of the present invention, a tray for a toaster oven is provided. The tray includes a bottom surface, a peripheral sidewall extending upwardly from the bottom surface and defining a food receiving area therein, a peripheral flange extending outwardly from the peripheral sidewall and being configured to be received in opposing slots in an internal heating compartment of a toaster oven, and a heating element configured to provide heat to the bottom surface.

According to yet another embodiment of the present invention, a method for performing a cooking function includes the steps of placing a food item inside a tray, the tray having an integral heating element, and inserting the tray inside a toaster oven such that an electrical contact of the heating element is received in a corresponding socket in a rear wall of the toaster oven.

According to yet another embodiment of the present invention, a tray for a toaster oven includes a bottom surface, a peripheral sidewall extending upwardly from the bottom surface and defining a food receiving area therein, a peripheral flange extending outwardly from the peripheral sidewall and being configured to be received in opposing slots in an internal heating compartment of a toaster oven, a scoop protruding from a rear wall of the tray, the scoop having an open top and being sloped so as to direct air into the food receiving area, and an array of vent openings in opposing sides of the tray allowing air to enter the food receiving area from the sides.

DETAILED DESCRIPTION OF THE PREFERRED EMBODIMENTS

Figure 1:
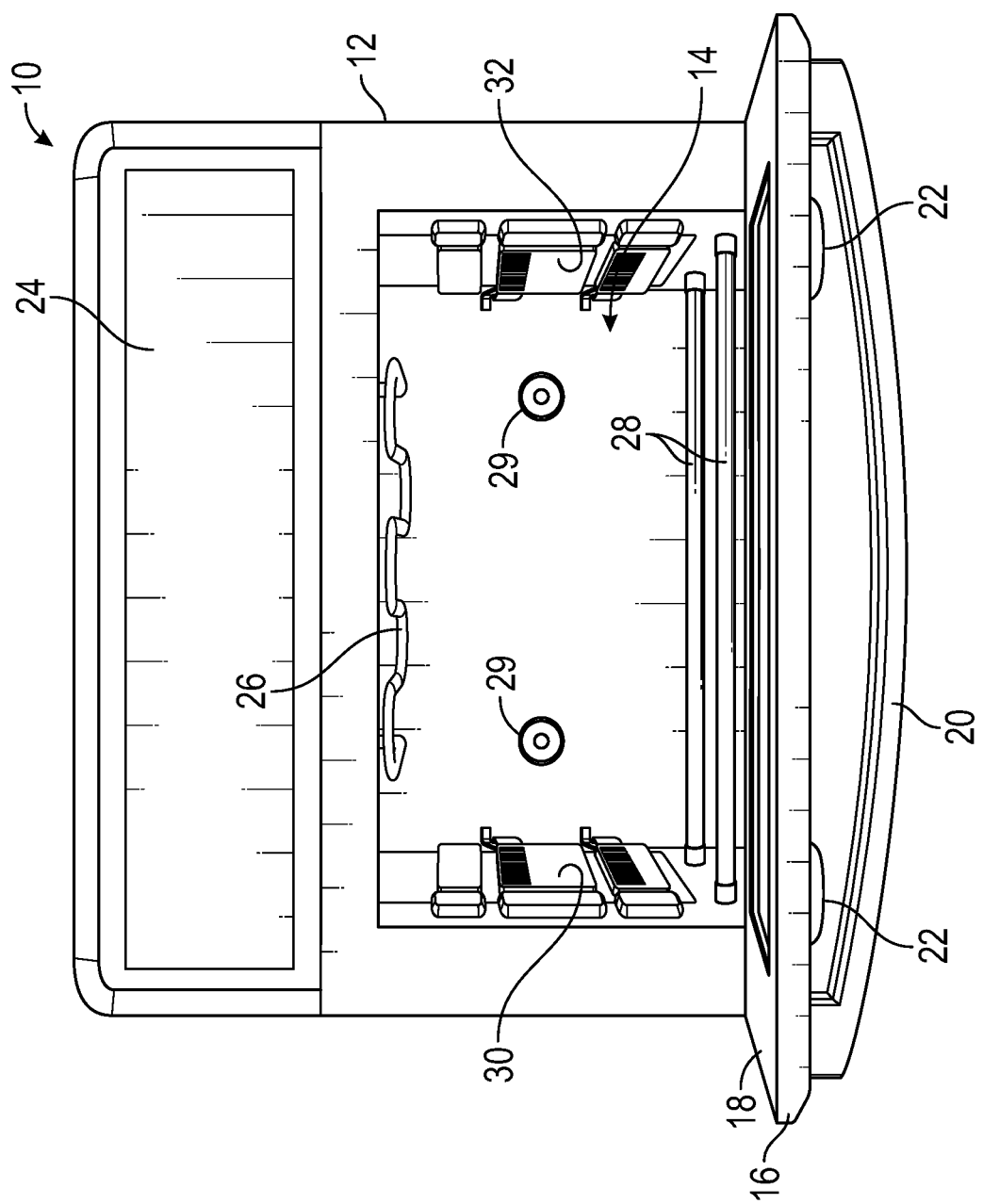
FIG. 1 is a front perspective view of a multifunction toaster oven according to an embodiment of the present invention.

Referring to FIG. 1, a multifunction toaster oven 10 according to an embodiment of the present invention is shown. The toaster oven 10 includes a thermally insulated housing 12 that defines an internal heating compartment 14. The compartment 14 may be accessed through a door 16 having a transparent front panel 18. In an embodiment, the door 16 is pivotally connected to the housing 12 at a lower edge thereof. As shown therein, the door 16 also has a handle 20 allowing a user to open the door 16 to provide access to the compartment 14. A plurality of feet 22 support the housing 12 in spaced relation to a countertop or other surface. As further shown in FIG. 1, the front of the housing 12 includes a panel 24 forming a user interface (comprising, for example, a graphic display, such as a LCD, and an array of user controls, not shown, as discussed hereinafter).

As further shown in FIG. 1, the toaster oven 10 includes one or more upper heating elements 26 positioned adjacent to a top surface of the internal compartment 14, and one or more lower heating elements 28 positioned adjacent to a bottom surface of the internal compartment 14. In an embodiment, the heating elements 26, 28 are Calrod® heaters, such as stainless steel Calrod® heaters, although any other type of heating element known in the art, such as quartz, infrared, tungsten, halogen, etc., may also be utilized without departing from the broader aspects of the present invention. The user interface 24 is electrically connected to, and configured to control, operation of the heating elements 26, 28. In particular, the user interface 24 includes a microprocessor (not shown) and control circuitry configured to control the heating elements 26, 28 in dependence upon a user input, and according to control algorithms stored in memory. In an embodiment, the upper and lower heating elements 26, 28 are independently controllable by the microprocessor and control circuitry. The back wall of the internal compartment 14 also includes one or more electrical contacts or sockets 29 for supplying electrical power to an additional heat element associated with a cooking tray, as disclosed hereinafter.

Figure 2:
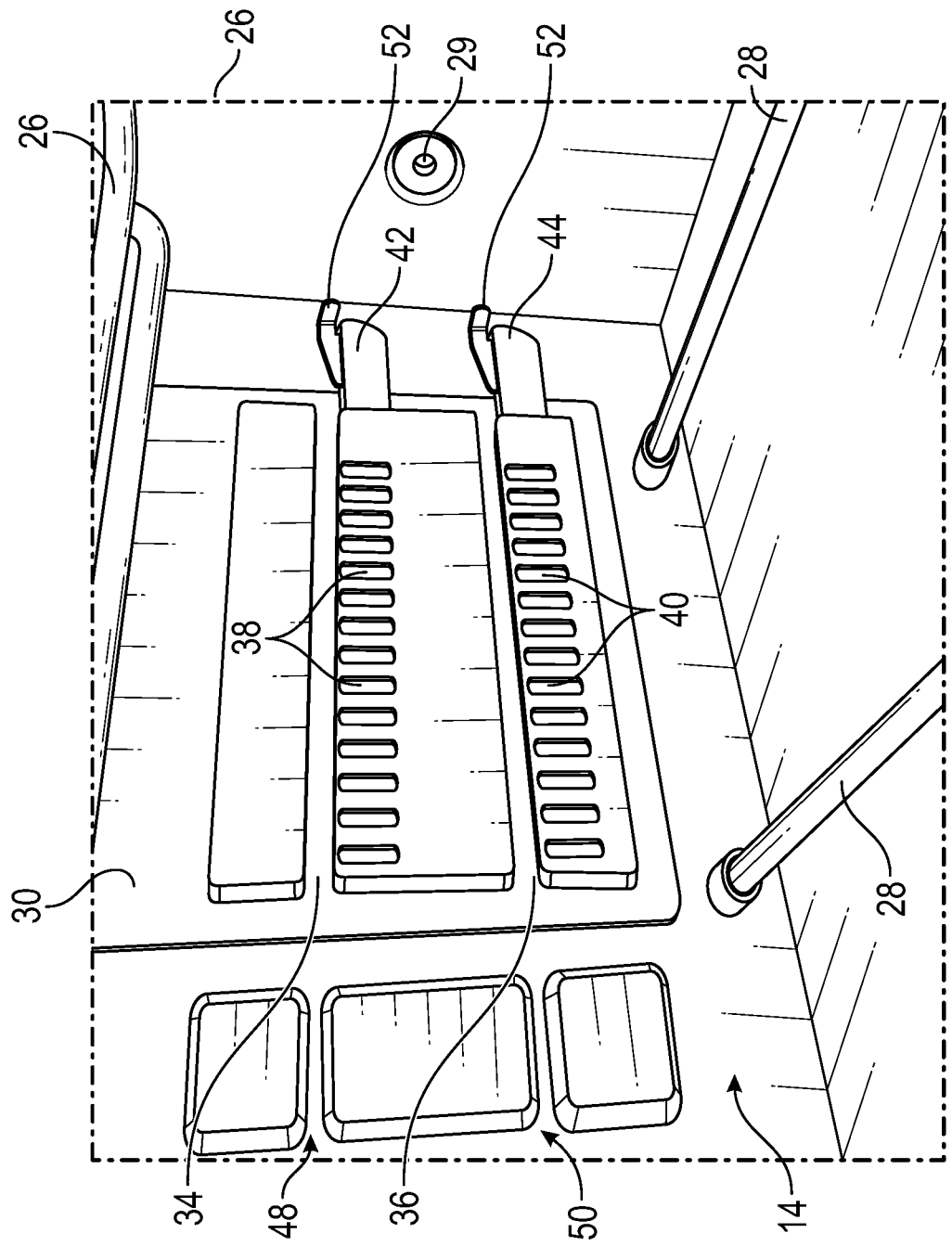
FIG. 2 is an enlarged, perspective view of the interior of the toaster oven of FIG. 1, illustrating side vents thereof.

With particular reference to FIGS. 1 and 2, opposing sides of the internal compartment 14 include removable vent panels 30, 32. As best shown in FIG. 2, the vent panels 30, 32 each include upper and lower horizontally-extending slots 34, 36 that slidably receive baskets or trays that support food items during the cooking process, as described in detailed hereinafter. The vent panels 30, 32 additionally include a first, upper array of vent openings 38 beneath the upper slot 34, and a second, lower array of vent openings 40 beneath the lower slot 36, as well as upper and lower slider members 42, 44 slidably mounted to the panels 30, 32 behind the first and second array of vent openings 38, 40, respectively. The slider members 42, 44 each include an array of openings that generally correspond in size, shape and number to the upper and lower vent openings 38, 40, respectively. The slider members 42, 44 are mounted to the vent panels 30, 32 in such a manner that they are spring-biased to a position where the spaces between the openings in the slider members 42, 44 are aligned or in registration with the vent openings 38, 40 to close off the vent openings 38, 40 (referred to herein as a closed position of the vent openings 38, 40). In this position, fluid communication between an air plenum 46 behind the vent panels 30, 32 and the internal compartment 14 is inhibited or prevented. As used herein, the term "prevented," as it is used in connection with the flow of air, or lack thereof, does not require a condition of absolute zero air flow, and contemplates some leakage of air due to mechanical tolerances between components and the like. The slider members 42, 44, however, are slidably moveable against the spring bias to a position where the openings in the slider members 42, 44 are aligned or in registration with the vent openings 38, 40, providing fluid communication between the air plenum 46 behind the vent panels 30, 32 and the internal compartment 14 (referred to herein as an open position of the vent openings 38, 40). In connection with the above, and as best shown in FIG. 2, the slider member 42, 44 have an engagement member or foot 52 at the distal end thereof that extends laterally towards the interior of the compartment 14 and which is configured to be engaged by an inserted basket or tray to open the vents, as described hereinafter.

Figure 3:
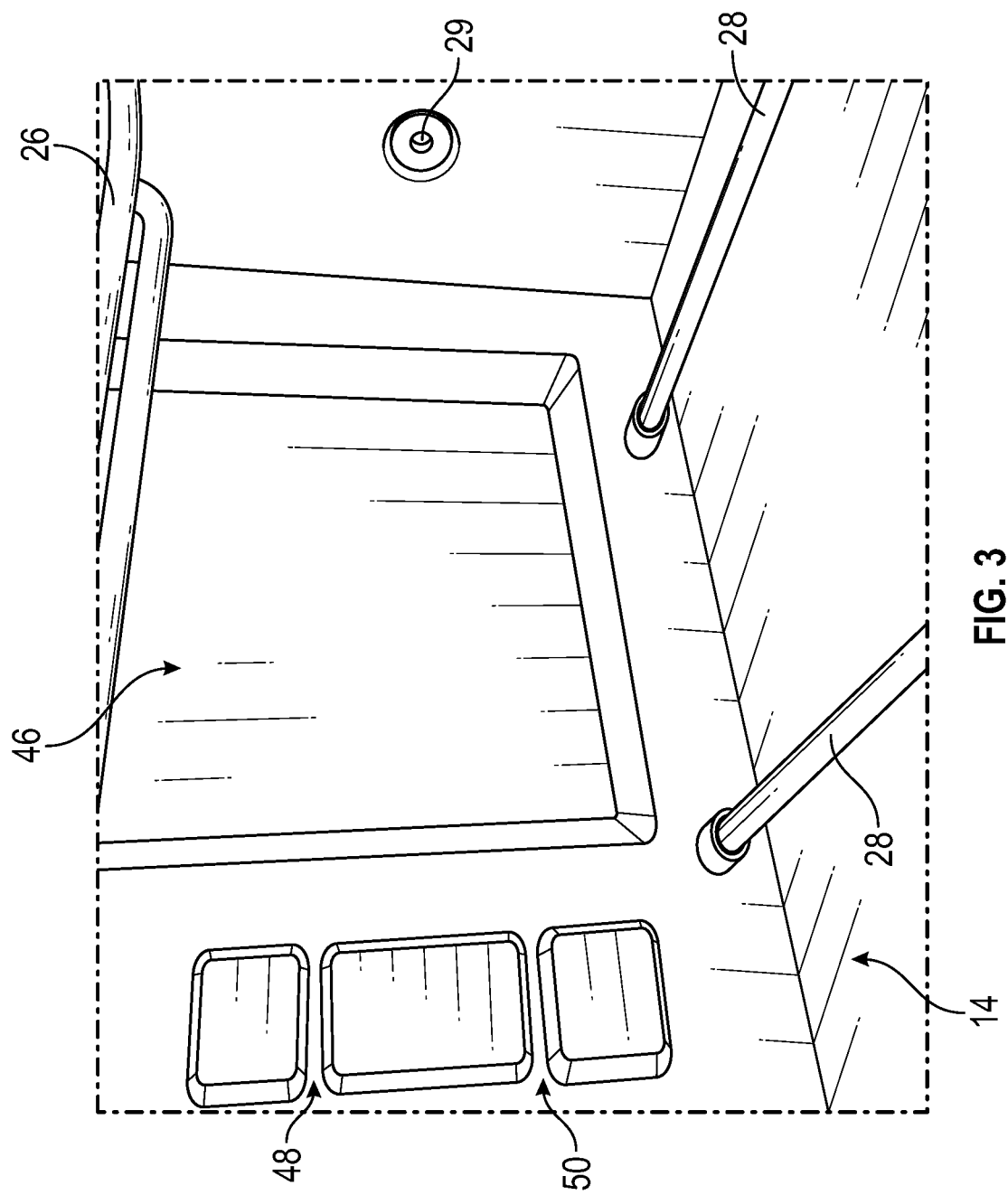
FIG. 3 is an enlarged, perspective view of the interior of the toaster oven of FIG. 1 with the side vents removed.

As further shown in FIGS. 2 and 3, the lateral sidewalls of the internal compartment 14 may also be formed with upper and lower slots 48, 50 that are aligned with the slots 34, 36 in the vent panels 30, 32 to facilitate insertion of cooking baskets and trays into the internal compartment 14. FIG. 3 also illustrates a side air plenum 14 in the sidewall of the compartment 14, which is normally covered by the vent panel 30. In an embodiment, the vent panels 30, 32 may be removably attached to the sidewall using a mechanical connection such as a tab and slot connection, although other connection means enabling for the removable connection of the vent panels 30, 32 to the sidewalls may also be utilized without departing from the broader aspects of the invention.

Figure 4:
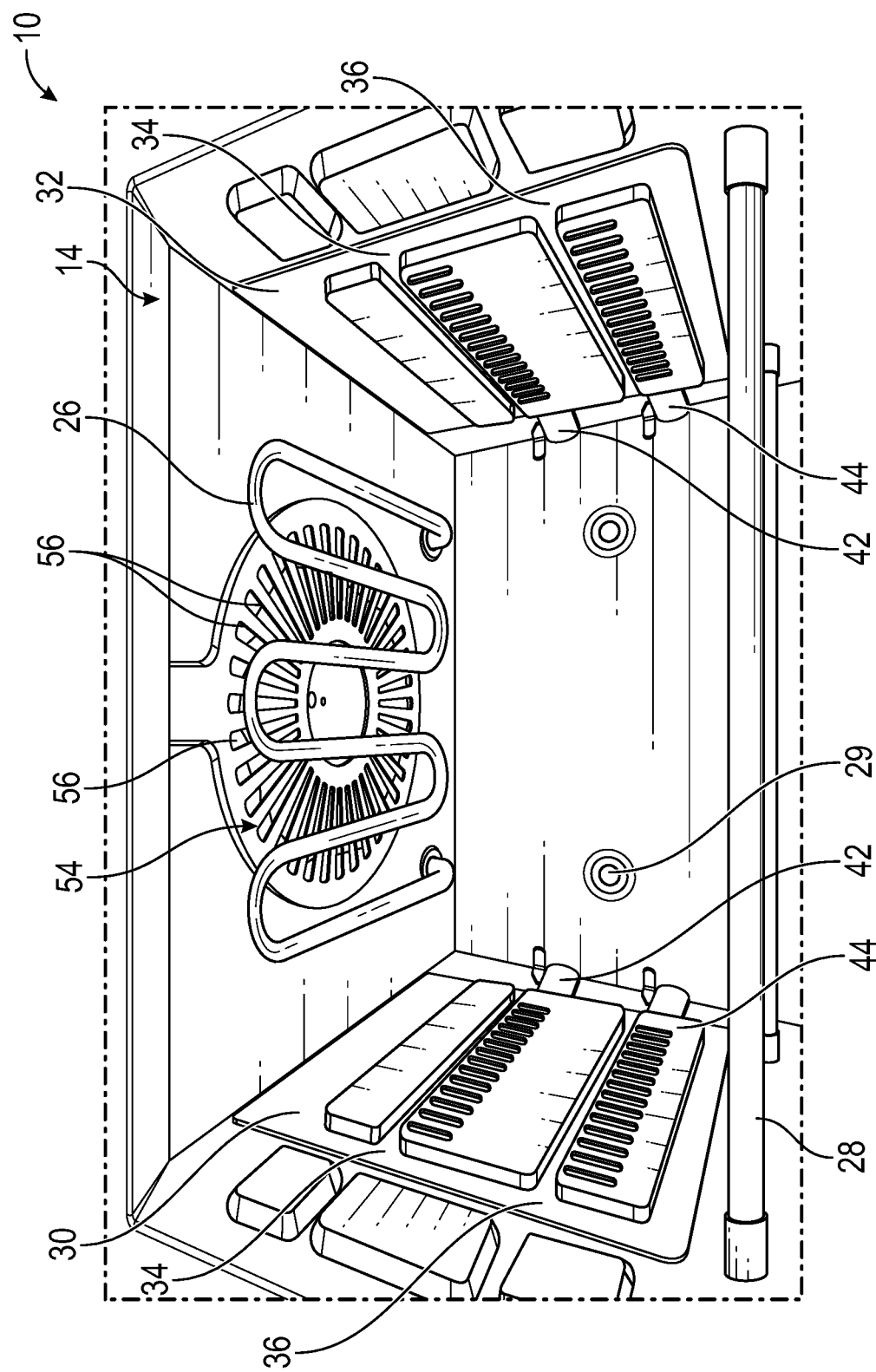
FIG. 4 is a perspective view of the interior of the toaster oven of FIG. 1, illustrating a top vent and damper thereof in an open position.
Figure 5:
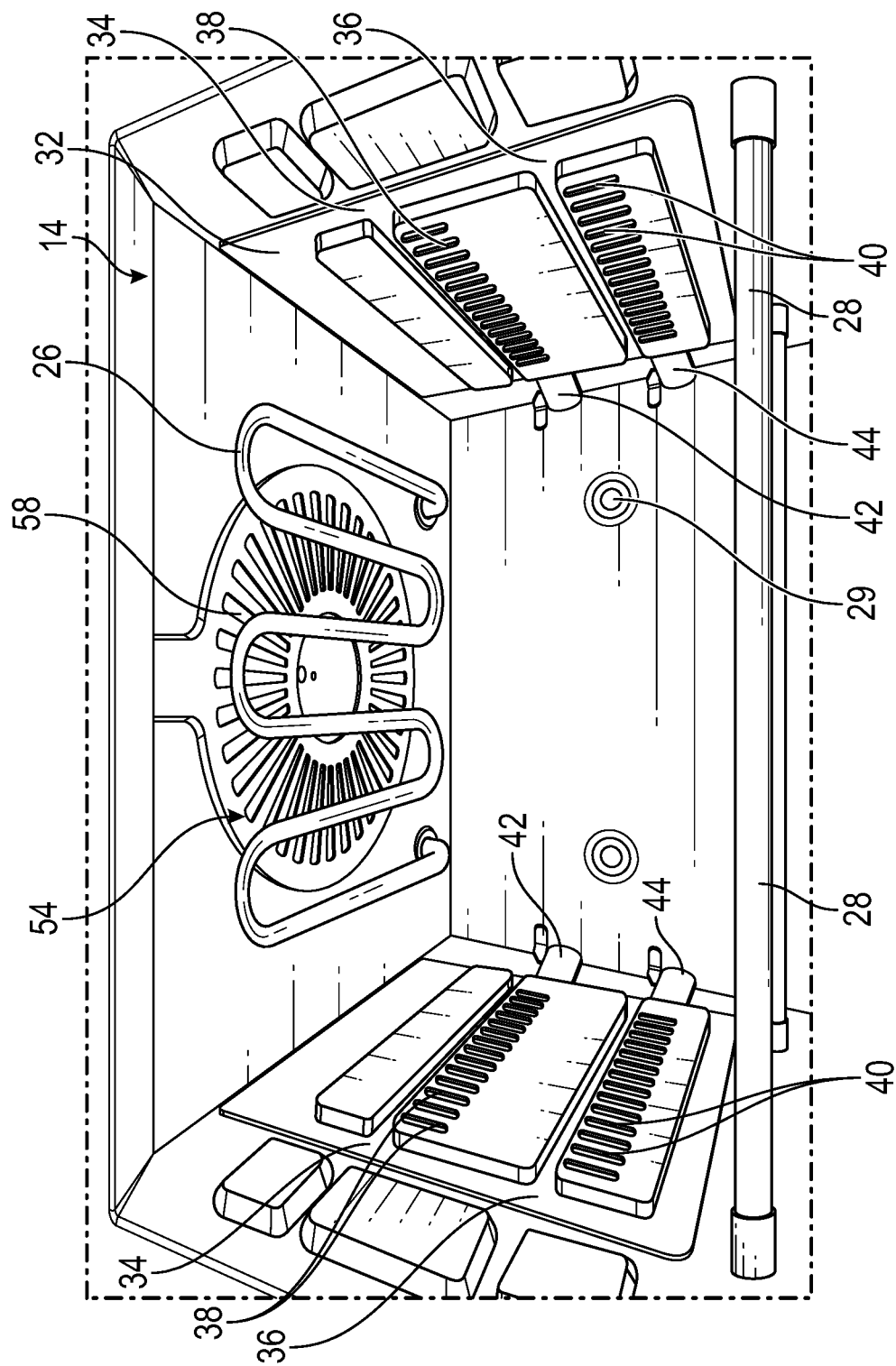
FIG. 5 is a perspective view of the interior of the toaster oven of FIG. 1, illustrating a top vent and damper thereof in a closed position.

Turning now to FIGS. 4 and 5, a top wall of the interior compartment 14 is formed with top vent 54 having a plurality of radial openings 56. The top vent 54 also includes a rotary damper 58 positioned behind the top wall, which is rotatable to selectively close off or provide free flow of air through the radial openings 56. For example, FIG. 4 illustrates the vent 54 and rotary damper 58 in an open position (and the side vents in their closed positions), allowing for the passage of air through the openings 56, while FIG. 5 illustrates the vent 54 and rotary damper 58 in a closed position (and the side vents in their open positions), obstructing/preventing the passage of air through the openings 56.

Figure 6:
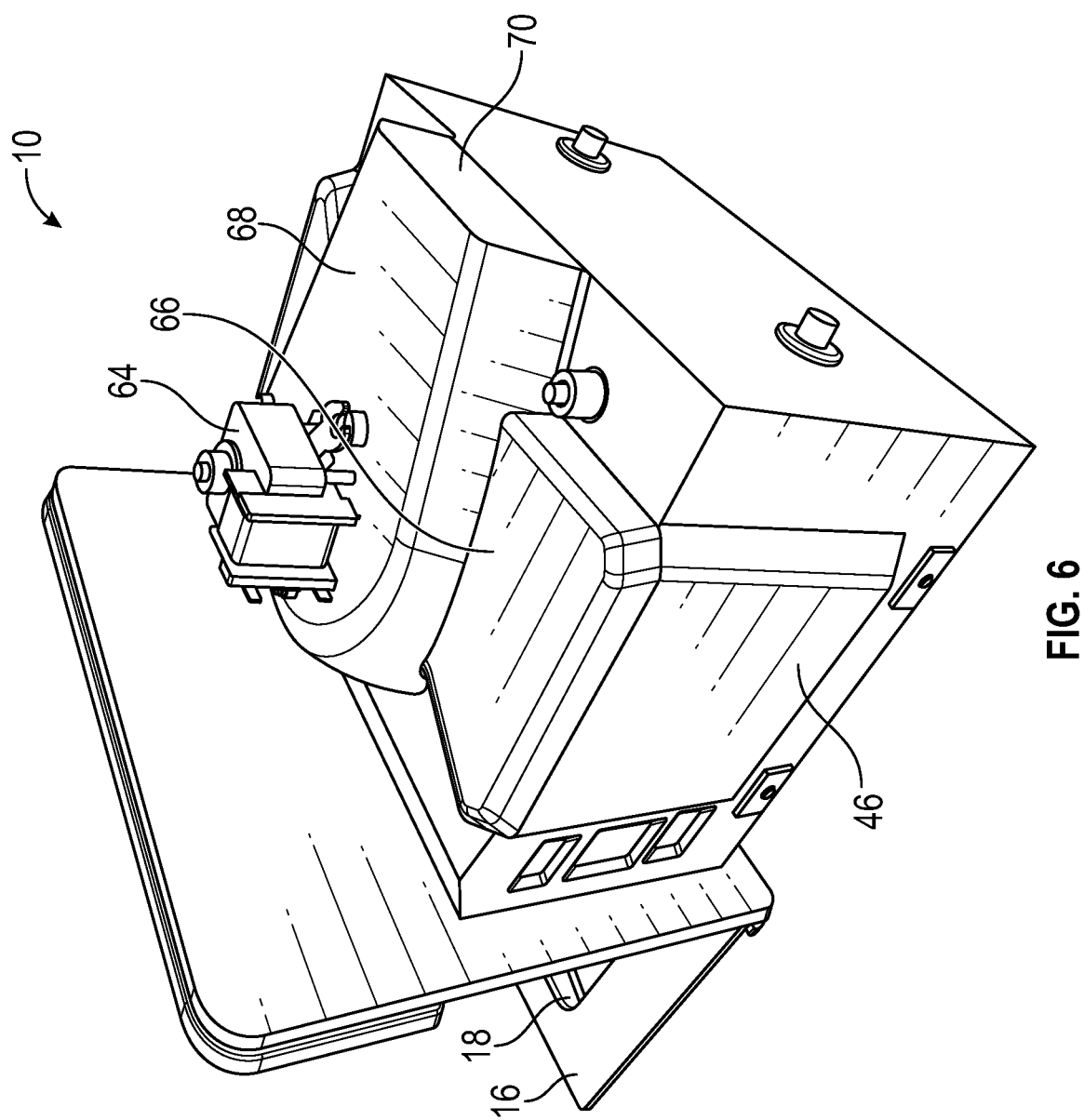
FIG. 6 is a rear perspective view of the toaster oven of FIG. 1 with an outer housing removed, and illustrating side air plenums.
Figure 7:
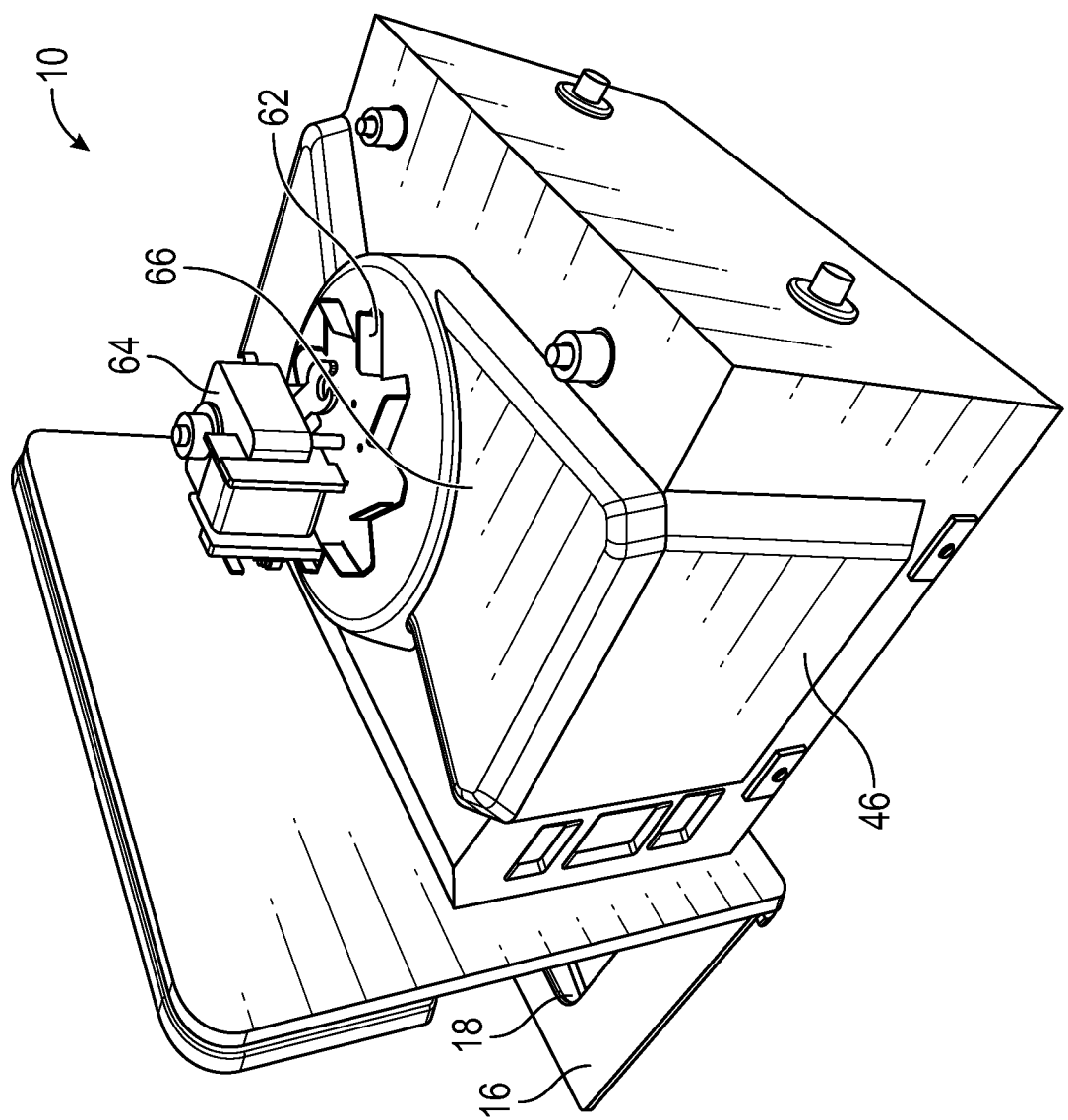
FIG. 7 is another rear perspective view of the toaster oven of FIG. 1 with the outer housing removed.
Figure 8:
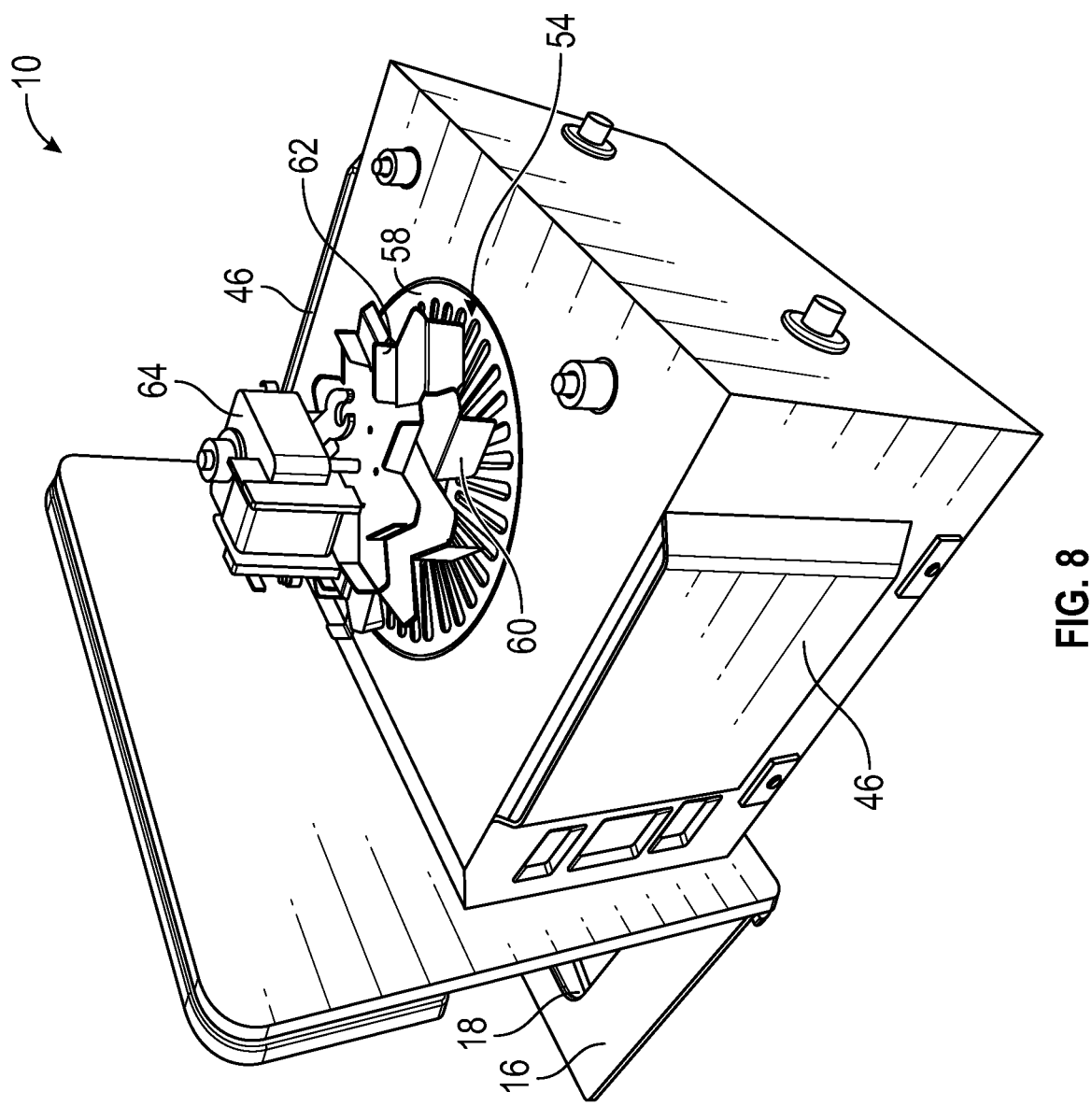
FIG. 8 is another rear perspective view of the toaster oven of FIG. 1 with the outer housing removed.

With reference to FIGS. 6-8, the multifunction toaster oven 10 is shown with the housing 12 removed. As best shown in FIG. 8, the toaster oven 10 includes an impeller 60 and a motor cooling fan 62 drivingly connected to a motor 64. These components are mounted within the housing 12 above the internal compartment 14. The impeller 60 is configured to generate a flow of air for passage into the internal compartment 14, as disclosed hereinafter. As also shown therein, air plenums 46 are formed in the sidewall of the interior compartment (e.g., as recesses in the interior compartment 14 or as bumped-out areas of the lateral sidewalls). These air plenums 46 serve as ducts that receive a flow of air generated by the impeller 60, in the manner described hereinafter.

As shown in FIG. 7, the impeller 60 is enclosed within a cover 66 (stamped or formed of high-temperature resistant plastic, for example) that defines an upper air plenum therein. The cover 66 has opposing ends that are connected to the side air plenums 46. In this manner fluid communication between the air generated by the impeller 60 and the side air plenums 46 is provided. That is, fluid communication between the upper air plenum and the side air plenums is provided by the configuration of the cover 66 and side air plenums 46. Finally, as shown in FIG. 6, the motor cooling fan 62 may be enclosed within a duct 68 having a rear opening 70, which directs air from the motor cooling fan 62 out of the rear opening 70.

Figure 9:
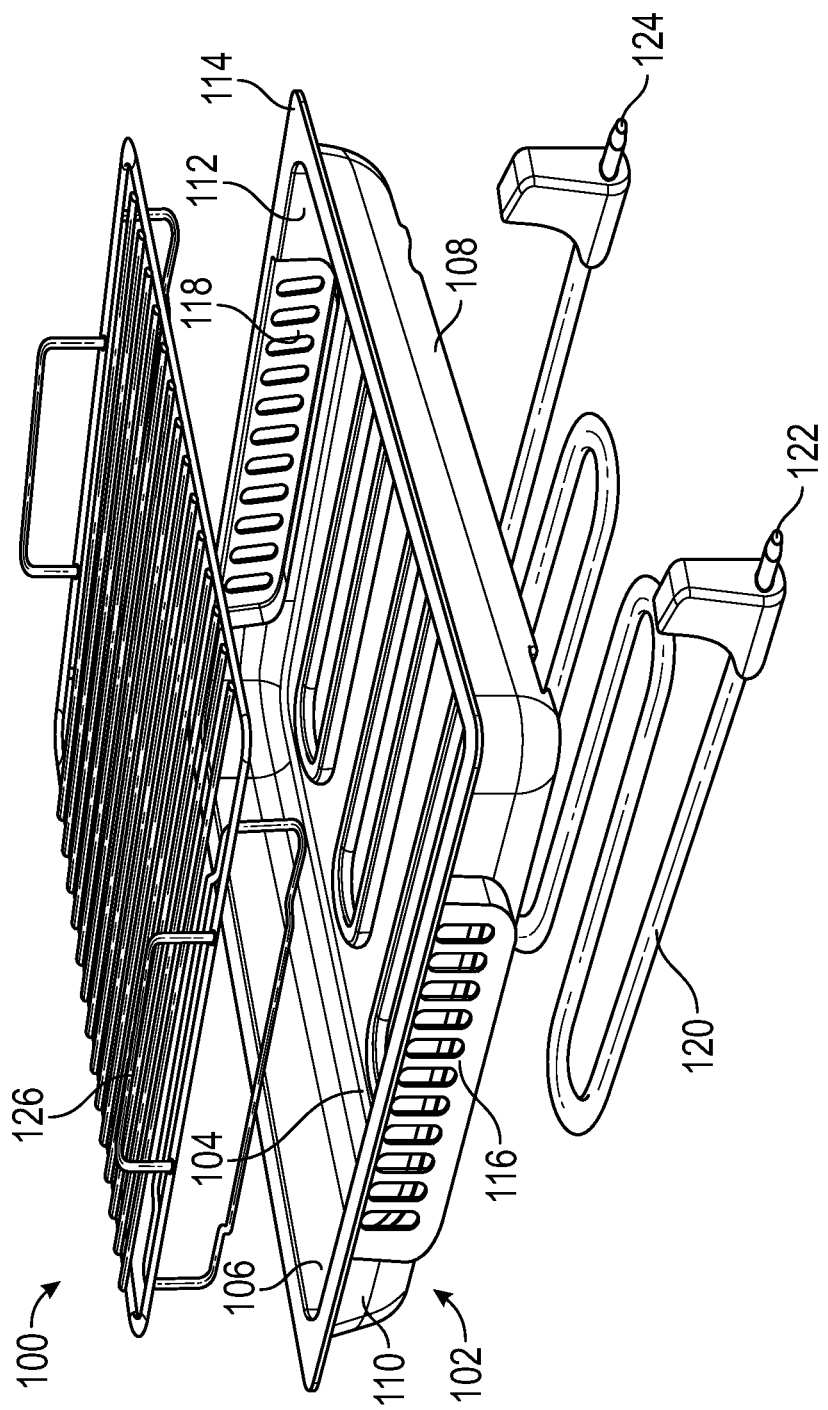
FIG. 9 is an exploded, perspective view of a power tray of the toaster oven of FIG. 1.
Figure 10:
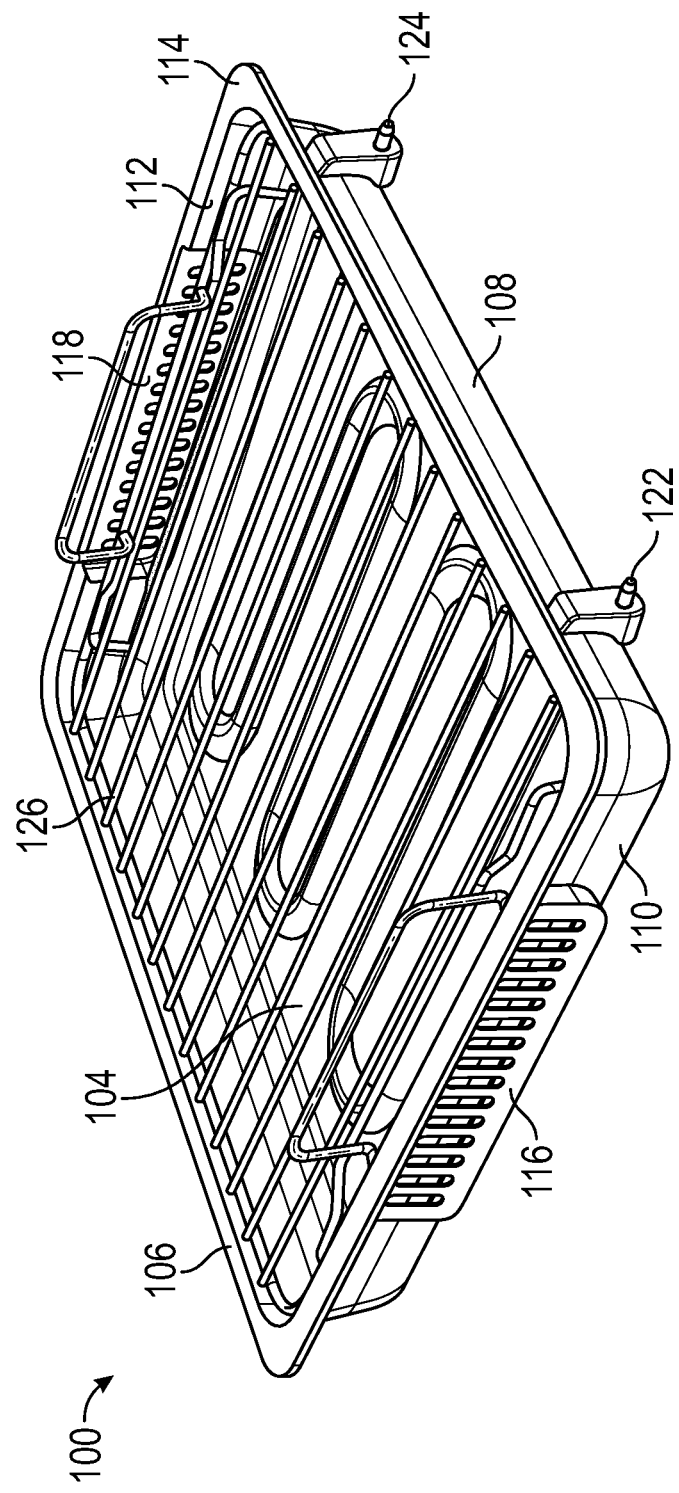
FIG. 10 is a perspective view of the power tray of FIG. 9.

Referring now to FIGS. 9 and 10, in an embodiment, the toaster oven 10 includes a power tray 100 that is configured to be received within the internal compartment 14. The power tray 100 includes a tray 102 having a bottom surface 104, a front wall 106, a rear wall 108, and opposed sidewalls 110, 112 extending upwardly from the bottom surface 104, and an upper flange 114 that extends around the periphery of the tray 102. As best shown in FIG. 9, the sidewalls 110, 112 include vents 116, 118, allowing for air to enter the tray 102 from the sides, as described hereinafter.

As further shown in FIG. 9, the power tray 100 includes a heating element 120 having a pair of electrical contacts 122, 124 mounted to the underside surface of the tray 102. While the heating element 120 is illustrated as being mounted to the underside surface, it is contemplated that the heating element 120 may, alternatively, be embedded within the bottom surface 104 of the tray 102. In an embodiment, the heating element 120 has a serpentine or wave configuration. In an embodiment, the heating element 120 is a Calrod® heater, such as a stainless steel Calrod® heater, although any other type of heating element known in the art, such as quartz, infrared, tungsten, halogen, etc., may also be utilized without departing from the broader aspects of the present invention. The electrical contacts 122, 124 are configured to be received within the sockets 29 in the rear wall of the internal compartment 14 when the power tray 100 is positioned in the upper slots 34, so as to receive a supply of electrical power therefrom to power the heating element 120.

As further shown in FIGS. 9 and 10, in embodiment the power tray 100 may include a wire rack 126 receivable within the tray 102 for elevating food items above the bottom surface 104 of the tray 102 to allow for the passage of air therebeneath.

In use, the power tray 100 is receivable within the upper slots 34 formed in the opposed vent panels 30, 32. In particular, the flange 114 of the tray 102 is slidably received within the slots 34 such that the tray 100 is supported by the lower shoulder of the slots 34. As the tray 100 is pushed inwardly into the compartment, the forward portion of the flange 114 contacts the feet 52 of the upper slider members 42 and slidably moves the slider members 42 against the spring bias. This sliding movement of the slider member 42 opens the vent openings 38 providing fluid communication between the side air plenums 46 and the interior compartment 14. Moreover, the tray 100 can be pushed further into the compartment 14 until the electrical contacts 122, 124 are received within the corresponding sockets 29 in the rear wall of the compartment 14, providing the heating element 120 of the tray 100 with a supply of electrical power. When the tray 100 is removed, the electrical contacts 122, 124 are disengaged, interrupting the supply of electrical power to the heating element 120. This rearward movement of the tray 100 also causes the flange 114 of the tray 102 to disengage from the feet 52 of the slider members 42, allowing the springs to move the slider members 42 back to their closed positions where the openings 38 are closed off (preventing fluid communication between the interior compartment 14 and the side air plenums 46).

Figure 11:
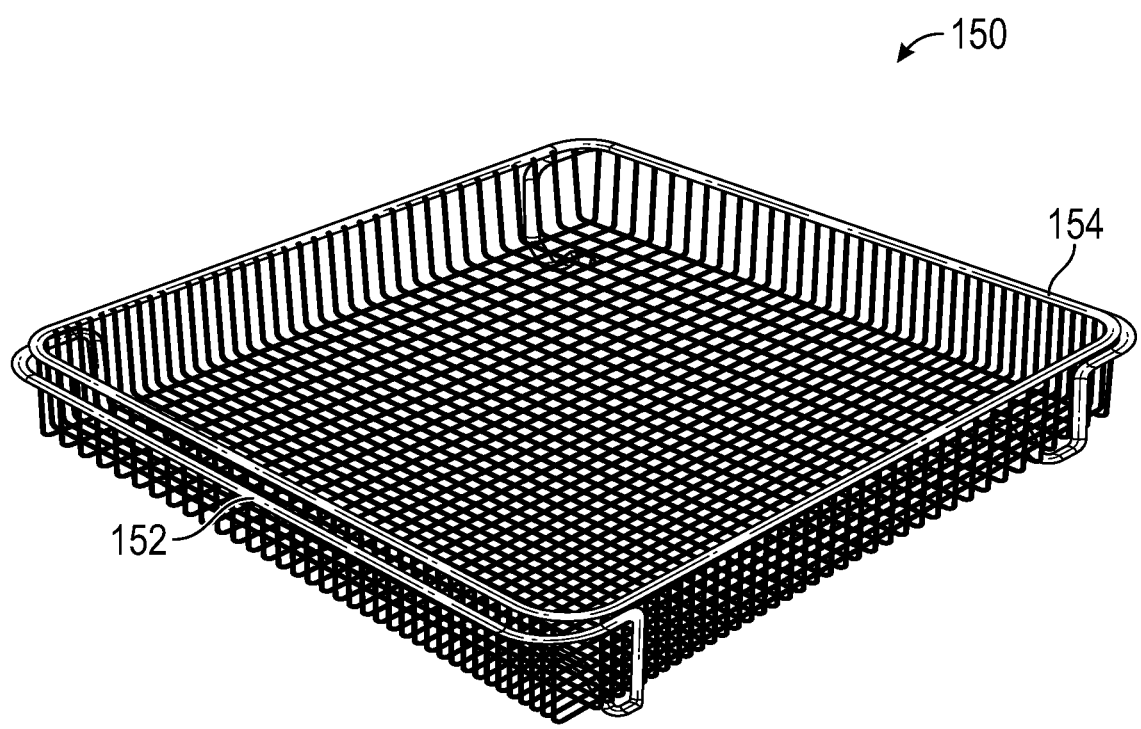
FIG. 11 is a perspective view of an air fry basket of the toaster oven of FIG. 1.

Turning now to FIG. 11, the toaster oven 10 also includes a frying rack or basket 150. The frying basket 150 is generally rectangular in shape and is formed from a plurality of crisscrossing wire members which define therebetween a plurality of openings or apertures which allow for the free flow of air through the frying basket 150. As shown therein, the frying basket 150 includes opposed guide rails 152, 154 that extend between the front and the rear of the basket 150 along the upper edge thereof.

In use, the frying basket 150 is receivable within the upper or lower slots 34, 36 formed in the opposed vent panels 30, 32. In particular, the opposed guide rails 152, 154 of the frying basket 150 are slidably received within the upper or lower slots 34 or 36 such that the basket 150 is supported by the lower shoulder of the slots 34 or 36. As the basket 150 is pushed inwardly into the compartment 14, forward ends of the guide rails 152, 154 contact the feet 52 of the upper or lower slider members 42, 44, and slidably moves the slider members 42 or 44 against the spring bias. This sliding movement of the slider member 42 or 44 opens the vent openings 38 providing fluid communication between the side air plenums 46 and the interior compartment 14. When the basket 150 is removed, the guide rails 152, 154 disengage from the feet 52 of the slider members 42 or 44, allowing the springs to move the slider members 42 or 44 back to their closed positions where the openings 38, 40 are closed off (preventing fluid communication between the interior compartment 14 and the side air plenums 46).

Figure 12:
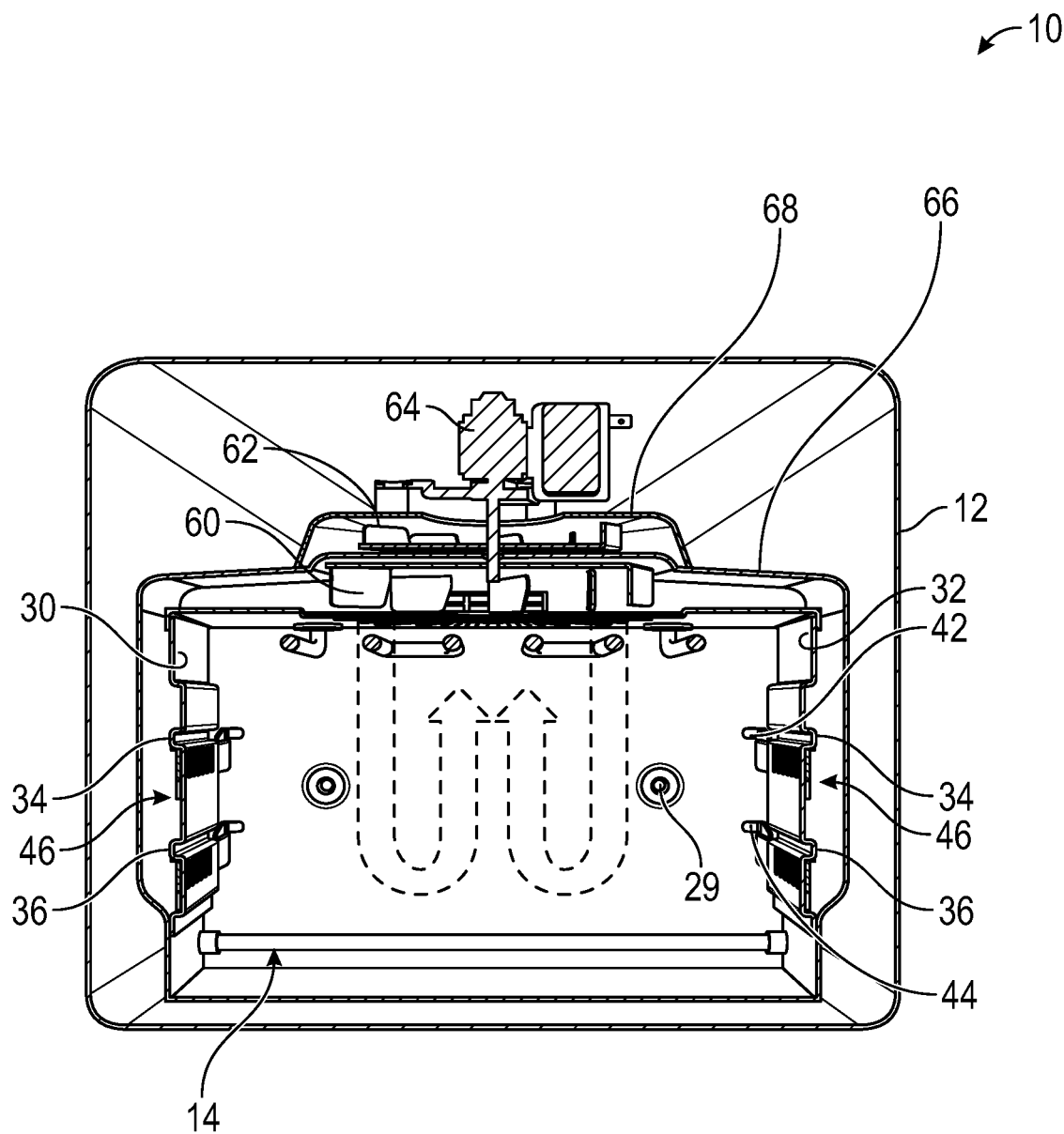
FIG. 12 is a front, cross-sectional view of the toaster oven of FIG. 1, illustrating an air circulation pathway when the side vents are closed.

With reference to FIG. 12, when the side vents are closed (i.e., when a tray 100 or basket 150 is not received in the upper or lower position to bias the slider members to their open positions), and the top vent 54 and damper 58 are open, the air generated by the impeller 60 circulates within the compartment 14 in the manner illustrated by the arrows. In particular, it is directed downwardly through the top vent 54 and circulated back out of the housing through the top vent 54 to provide standard convection cooking.

Figure 13:
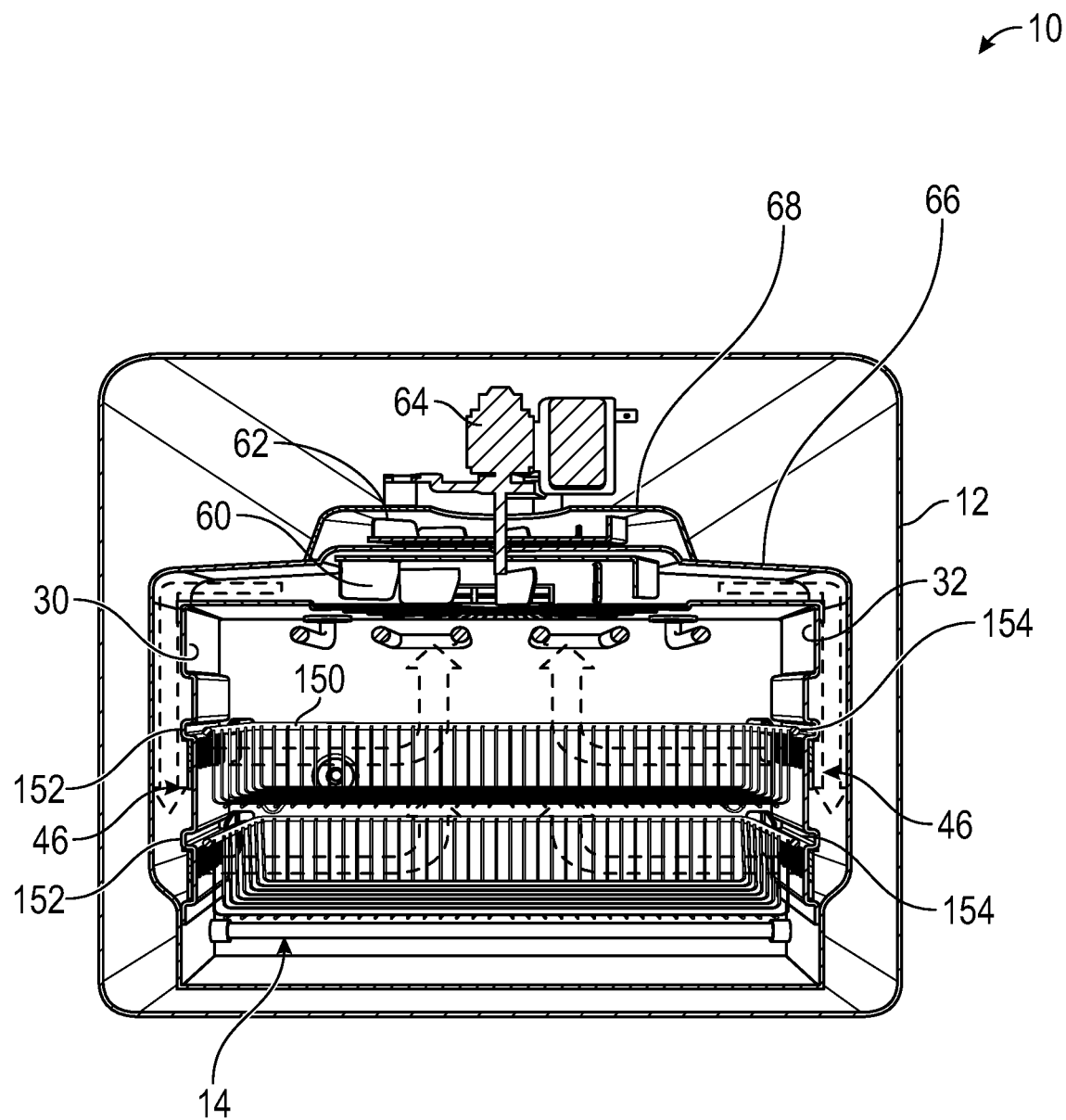
FIG. 13 is a front, cross-sectional view of the toaster oven of FIG. 1, illustrating an air circulation pathway when air fryer baskets are inserted and the side vents are open.

With reference to FIG. 13, with two frying baskets 150 in place in the upper and lower slots 34, 36, the slider members 42, 44 are moved against the spring bias to provide fluid communication between the interior compartment 14 and the side air plenums 46 through the vent openings 38 in the vent plates 30, 32. Air generated by the impeller 60 is circulated through the upper air plenum defined by the cover 66, into the side air plenums 46, and into the interior compartment 14 through the vent openings 38, 40. As illustrated, this hot air passes around food items received in the baskets 150.

Figure 14:
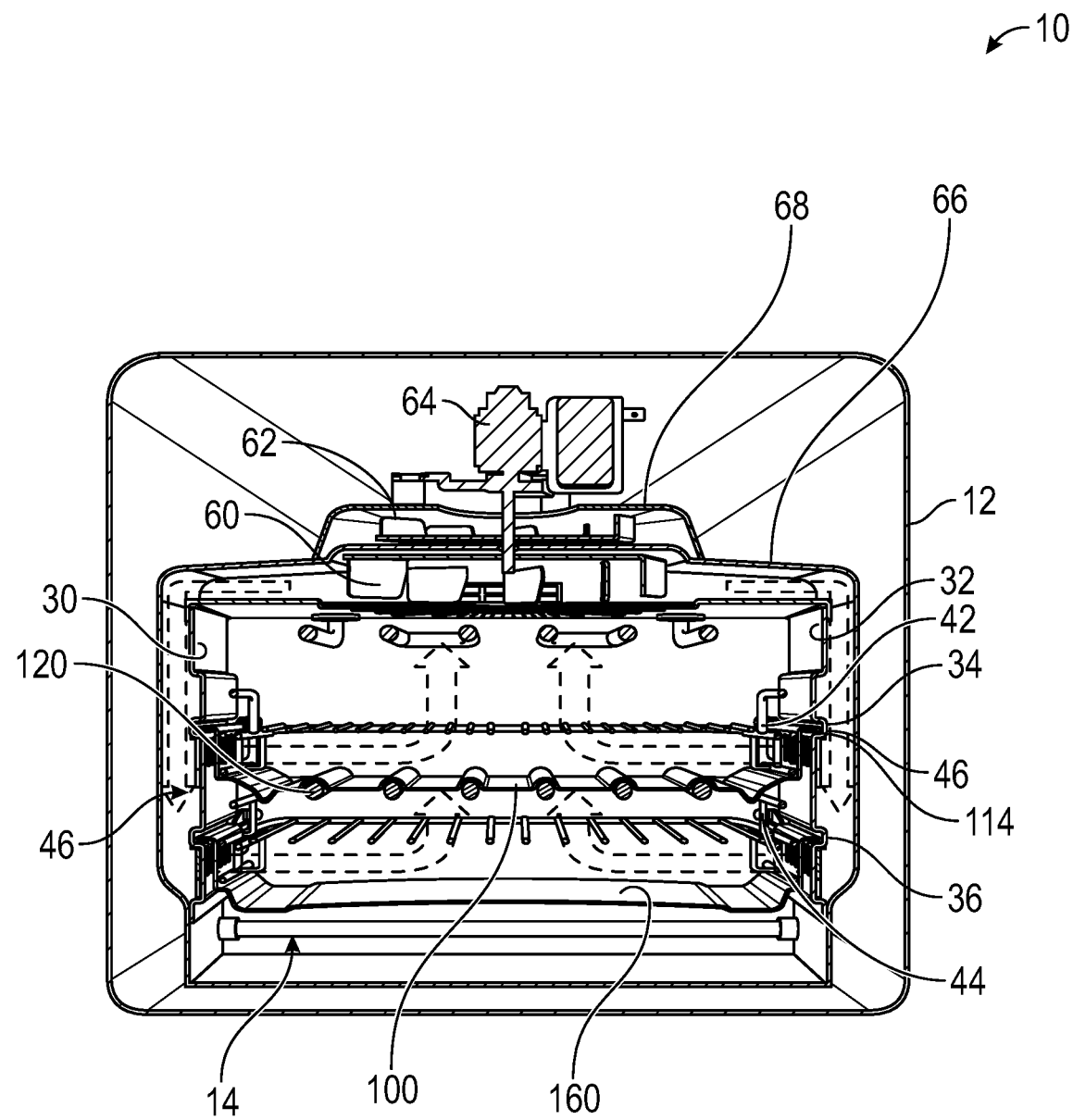
FIG. 14 is a front, cross-sectional view of the toaster oven of FIG. 1, illustrating an air circulation pathway when trays are inserted and the side vents are open.

Turning now to FIG. 14, a power tray 100 is shown received in the upper slots 34, while a tray 160 (similar to power tray 100 but with no integral heating element) is shown received in the lower slots 36. As the trays 100, 160 are inserted, the slider members 42, 44 are moved against the spring bias to provide fluid communication between the interior compartment 14 and the side air plenums 46 through the vent openings 38 in the vent plates 30, 32. Air generated by the impeller 60 is circulated through the upper air plenum defined by the cover 66, into the side air plenums 46, and into the interior compartment 14 through the vent openings 38, 40. This air then passes into the trays 100, 160 through the vents in the opposing sidewalls thereof, which are in registration with the upper and lower openings 38, 40 in the vent plates 30, 32. As illustrated, this hot air passes around food items received in the trays 100, 160. The heating element 120 of the upper, power tray 150 provides additional heat to warm or cook food items within the tray 150, as well as provides surface browning for food items received in the lower tray 160.

In addition to the above, standard trays without features that engage with the feet 52 on the slider members 42, 44, when inserted, can be utilized with the toaster oven 10 as well, and as desired. Use of such trays will not open the vents in the sidewalls, allowing for even more customized and varied control over the specific air circulation paths and cooking functions.

As disclosed above, the multifunction toaster oven 10 of the present invention has variable venting and air paths that are controlled by selectively inserting specially configured baskets or trays that actuate spring-biased slider members to open vents in the sidewalls of the interior compartment. In this respect, the toaster oven 10 will automatically be configured to provide certain air flow routes in dependence upon whether or not trays or baskets are inserted in the interior compartment. Moreover, as disclosed herein, the toaster oven 10 includes a power tray 100 that is equipped with an embedded or attached heating element 120 for browning via the direct contact surface above it (to which it is embedded or attached) and/or broil or browning food on a tray or basket located beneath it. This level of cooking functionality has heretofore not been seen in the art. Still further, in contrast to existing devices which only accommodate a single tray, the toaster oven 10 of the present invention utilizes two trays or baskets, allowing for increased cooking capacity and/or the ability to carry out multiple different cooking functions simultaneously (e.g., convection cooking in an upper tray 100 and air frying and or broiling in a lower basket 150 or tray 160).

As also disclosed above, the ability to easily remove the vent panels 30, 32 allows for easy cleaning of the vent panels 30, 32, as well as easy access to and cleaning of the interior surfaces of the oven (including the side air plenums 46).

Figure 15:
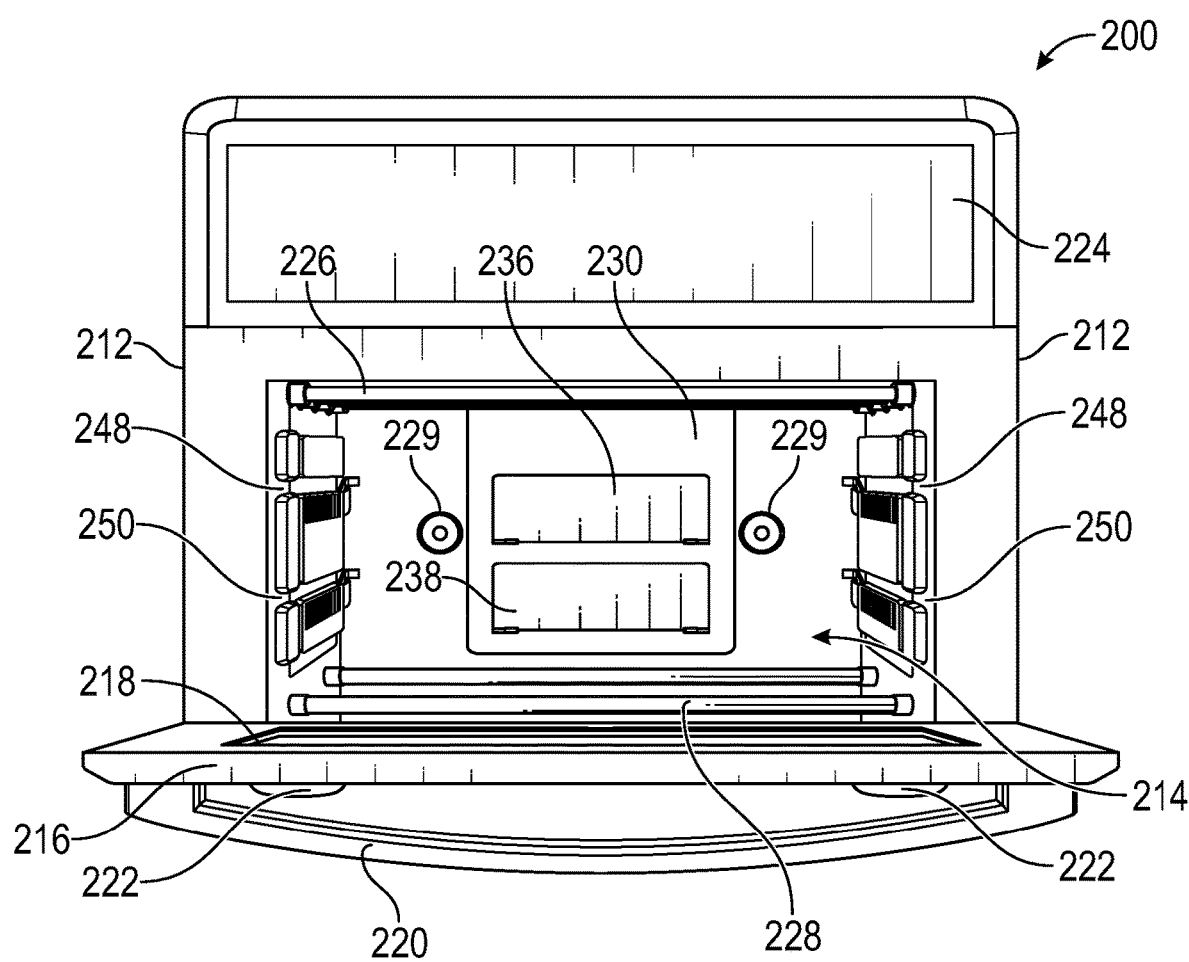
FIG. 15 is a front perspective view of a multifunction toaster oven according to another embodiment of the present invention.

Referring to FIG. 15 a multifunction toaster oven 200 according to another embodiment of the present invention is illustrated. The toaster oven 200 is generally similar in overall construction to toaster oven 100, and includes a thermally insulated housing 212 that defines an internal heating compartment 214. The compartment 214 may be accessed through a door 216 having a transparent front panel 218. In an embodiment, the door 216 is pivotally connected to the housing 212 at a lower edge thereof. As shown therein, the door 216 also has a handle 220 allowing a user to open the door 216 to provide access to the compartment 214. A plurality of feet 222 support the housing 212 in spaced relation to a countertop or other surface. As further shown in FIG. 15, the front of the housing 212 includes a panel 224 forming a user interface (comprising, for example, a graphic display, such as a LCD, and an array of user controls, not shown, as discussed hereinafter).

As further shown in FIG. 15, the toaster oven 200 includes one or more upper heating elements 226 positioned adjacent to a top surface of the internal compartment 214, and one or more lower heating elements 228 positioned adjacent to a bottom surface of the internal compartment 214. In an embodiment, the heating elements 226, 228 are Calrod® heaters, such as stainless steel Calrod® heaters, although any other type of heating element known in the art, such as quartz, infrared, tungsten, halogen, etc., may also be utilized without departing from the broader aspects of the present invention. The user interface 224 is electrically connected to, and configured to control, operation of the heating elements 226, 228. In particular, the user interface 224 includes a microprocessor (not shown) and control circuitry configured to control the heating elements 226, 228 in dependence upon a user input, and according to control algorithms stored in memory. In an embodiment, the upper and lower heating elements 226, 228 are independently controllable by the microprocessor and control circuitry. The back wall of the internal compartment 214 also includes one or more electrical contacts or sockets 229 for supplying electrical power to an additional heat element associated with a cooking tray, as disclosed hereinafter.

As further shown in FIG. 15, the opposed, lateral sidewalls of the internal compartment 14 are formed with upper and lower slots 248, 250 that facilitate insertion, support, and positioning of cooking baskets and/or trays in the internal compartment 14, as discussed hereinafter.

Figure 16:
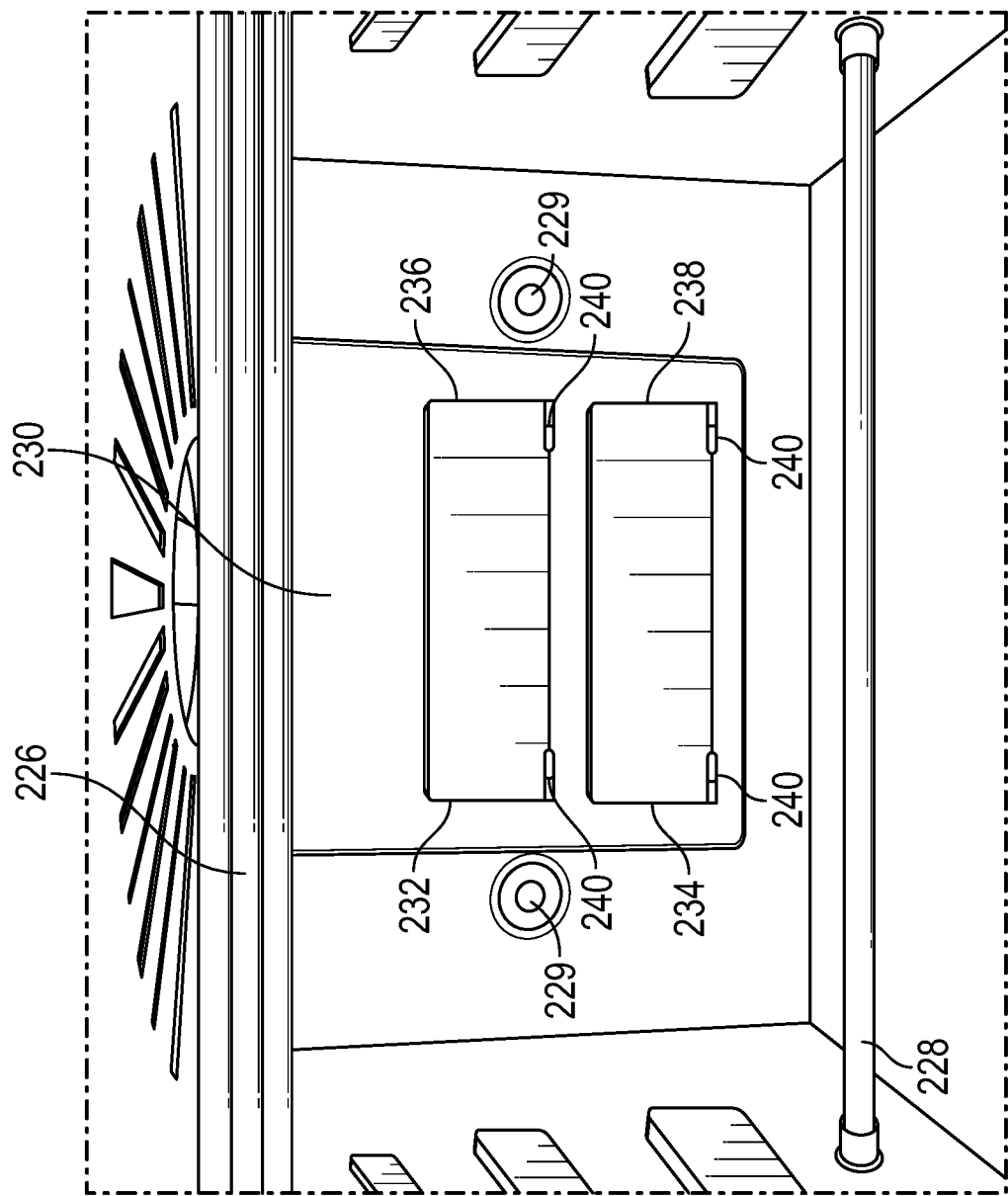
FIG. 16 is an enlarged, perspective view of the interior of the toaster oven of FIG. 15, illustrating rear vents thereof.
Figure 18:
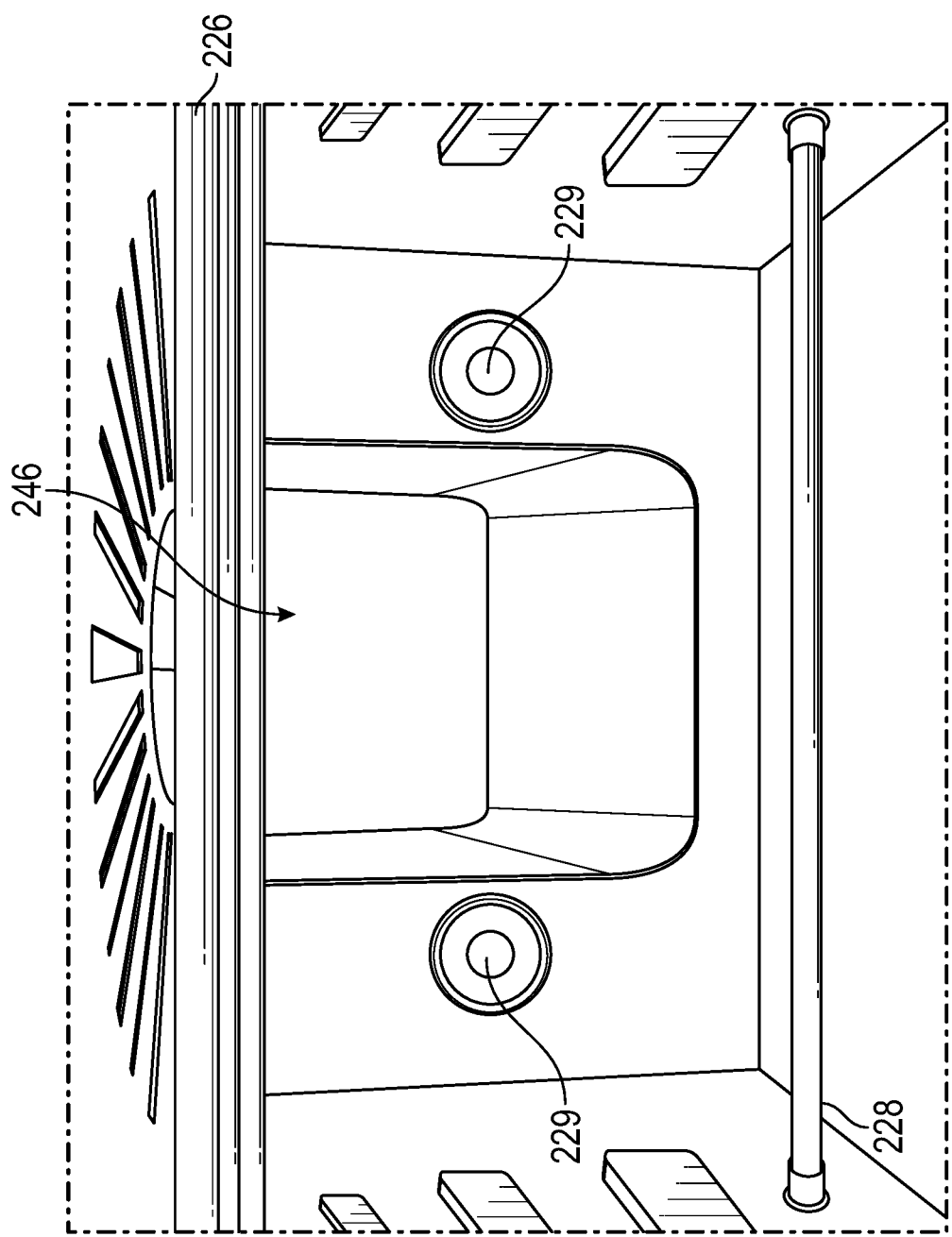
FIG. 18 is an enlarged, perspective view of the interior of the toaster oven of FIG. 15 with the rear vents removed.

Turning now to FIG. 16, the rear wall of the internal compartment 14 includes a removable vent panel 230. As best shown in FIGS. 16, the vent panel 230 includes upper and lower vent openings 232, 234, and upper and lower dampers 236, 238 that are pivotably or hingedly mounted in the openings 232, 234, respectively. For example, in an embodiment, the dampers 236, 238 may be pivotally connected to the vent panel 230 via opposed mounting pins 240 along the lower edges of the vent openings 232, 234. In the preferred embodiment, torsion springs associated with each mounting pins 240 provide a rotational biasing force on the dampers 236, 238 that spring-biases the dampers 236, 238 to a closed position where the dampers 236, 238 extend across the vent openings 232, 234. In this position, fluid communication between a rear air plenum 246 (shown in FIG. 18) behind the vent panel 230 and the internal compartment 214 is prevented (referred to as a closed position of the vent). The dampers 236, 238, however, are pivotably or rotationally moveable against the bias of the torsion spring to a position where the dampers 236, 238 do not extend across the openings 232, 234, allowing for fluid communication between the air plenum 246 and the internal compartment 214 (referred to as an open position of the vent).

Figure 17:
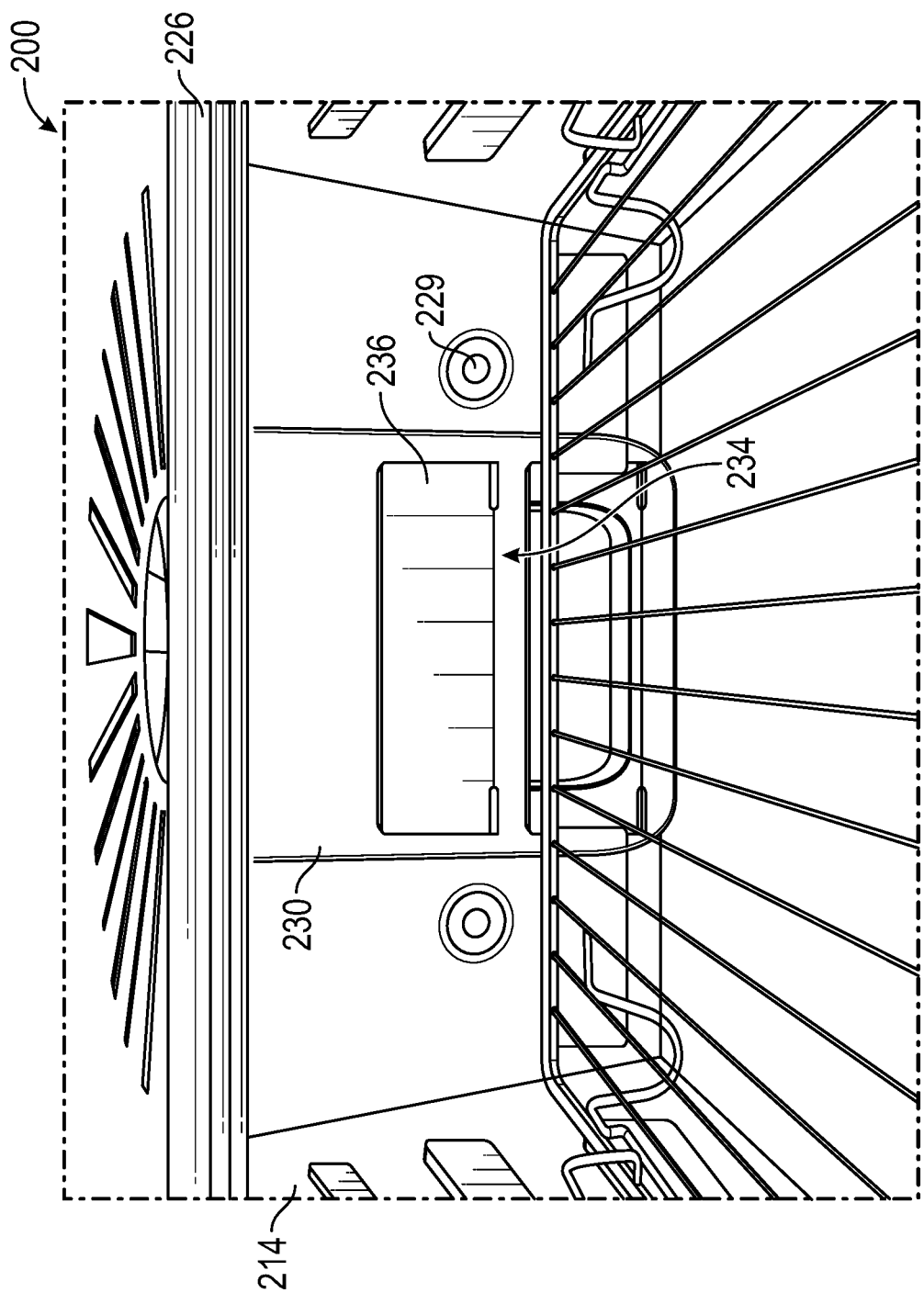
FIG. 17 is an enlarged, perspective view of the interior of the toaster oven of FIG. 15, showing opening of the rear vents.

FIG. 17 illustrates the lower damper 238 in its open position, allowing for fluid communication between the rear air plenum 246 behind the vent plate 230 and the interior compartment 214 when a cooking tray is inserted.

Figure 19:
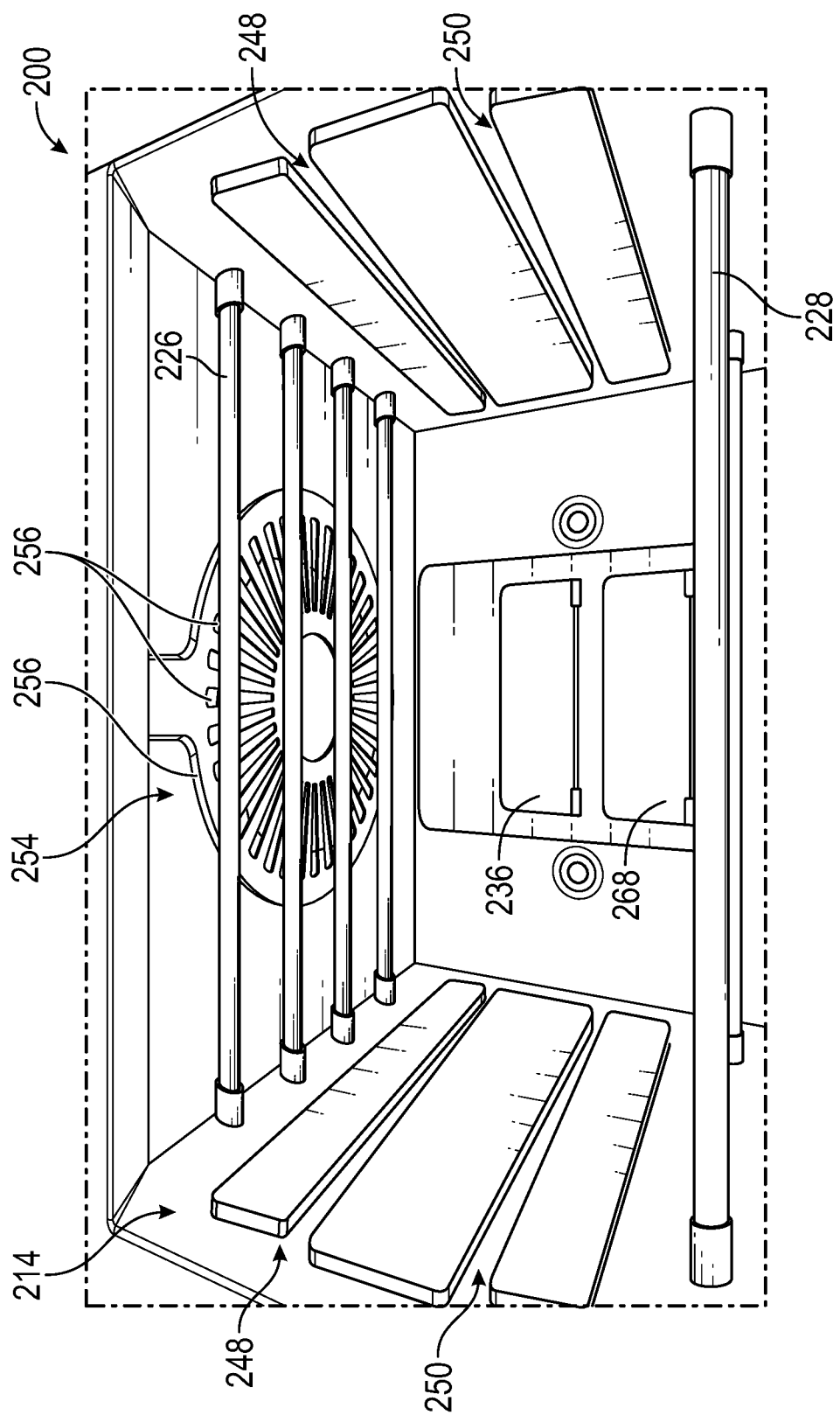
FIG. 19 is a perspective view of the interior of the toaster oven of FIG. 15, illustrating a top vent and damper thereof in an open position.
Figure 20:
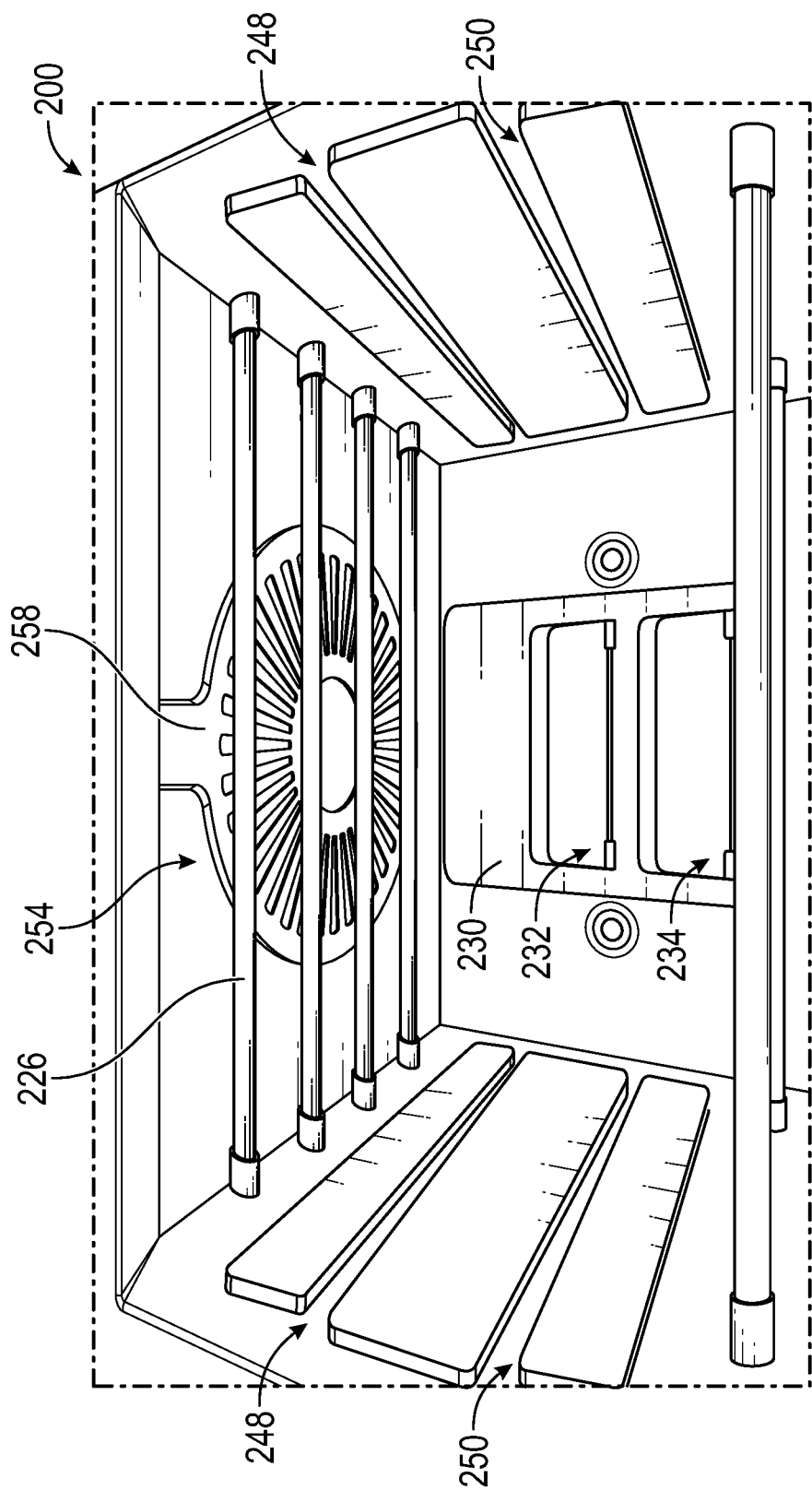
FIG. 20 is a perspective view of the interior of the toaster oven of FIG. 15, illustrating a top vent and damper thereof in a closed position.

With reference to FIGS. 19 and 20, similar to the embodiment described above, a top wall of the interior compartment 214 is formed with top vent 254 having a plurality of radial openings 256. The top vent 254 also includes a rotary damper 258 positioned behind the top wall, which is rotatable to selectively close off or provide free flow of air through the radial openings 256. For example, FIG. 19 illustrates the vent 254 and rotary damper 258 in an open position (and the side vents in their closed positions), allowing for the passage of air through the openings 256, while FIG. 20 illustrates the vent 254 and rotary damper 258 in a closed position (and the side vents in their open positions), obstructing/preventing the passage of air through the openings 256.

Figure 21:
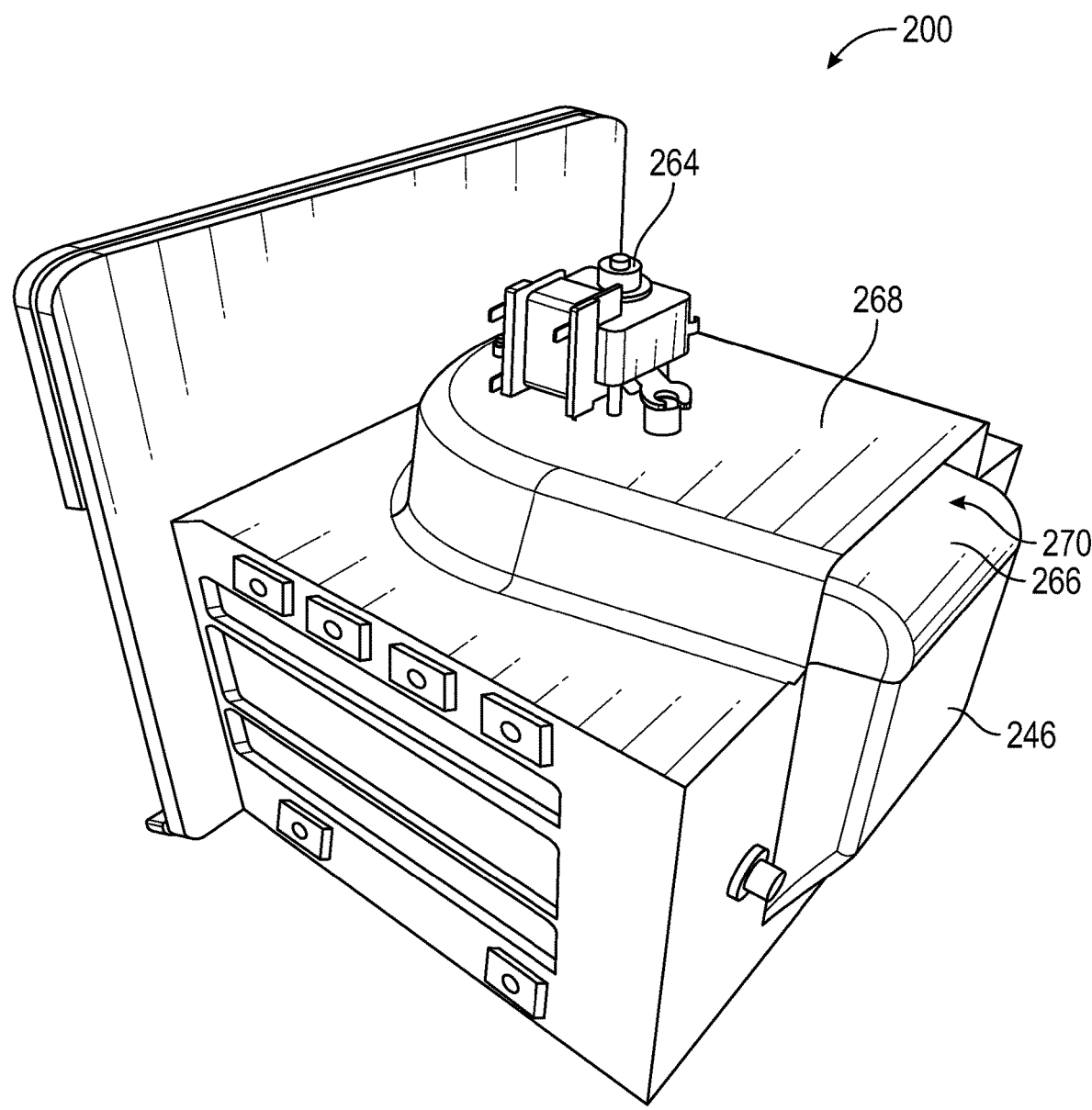
FIG. 21 is a rear perspective view of the toaster oven of FIG. 15 with an outer housing removed, and illustrating side air plenums.
Figure 22:
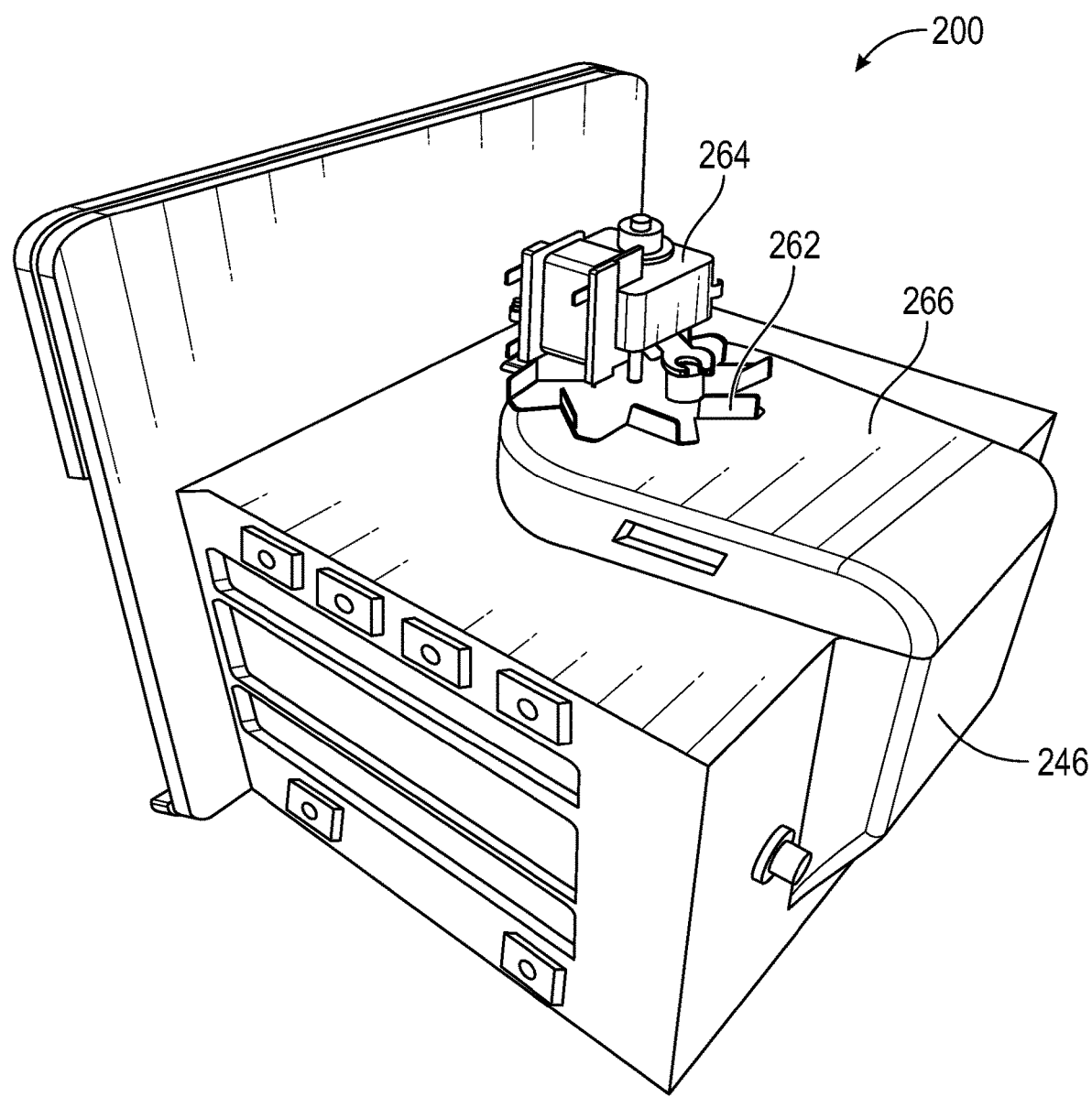
FIG. 22 is another rear perspective view of the toaster oven of FIG. 15 with the outer housing removed.
Figure 23:
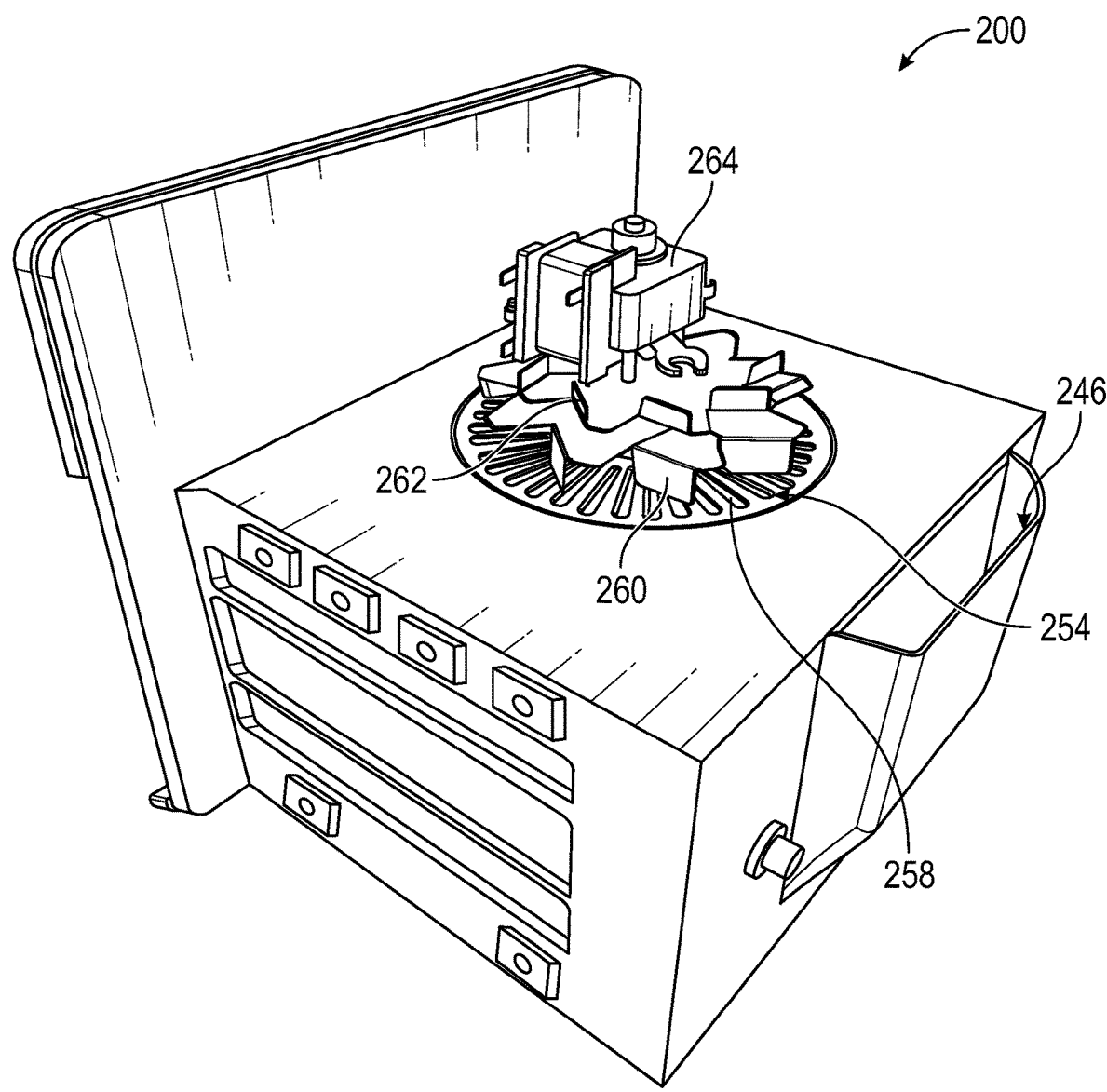
FIG. 23 is another rear perspective view of the toaster oven of FIG. 15 with the outer housing removed.

With reference to FIGS. 21-23, the multifunction toaster oven 200 is shown with the housing 212 removed. As best shown in FIG. 23, the toaster over 210 includes an impeller 260 and a motor cooling fan 262 drivingly connected to a motor 264, as disclosed above in connection with the toaster oven 10. These components are mounted within the housing 12 above the internal compartment 214. The impeller 260 is configured to generate a flow of air for passage into the internal compartment 214, as disclosed hereinafter. As also shown therein, rear air plenum 246 is formed in the rear wall of the interior compartment (e.g., as a recess in the interior compartment 214 or as bumped-out areas of the rear wall). These rear air plenum 246 serve as a duct that receives a flow of air generated by the impeller 260, in the manner described hereinafter.

As shown in FIG. 22, the impeller 260 is enclosed within a cover 266 (stamped or formed of high-temperature resistant plastic, for example) that defines an upper air plenum therein. The cover 266 is connected to the rear air plenum 246. In this manner fluid communication between the air generated by the impeller 260 and the rear air plenum 246 is provided. That is, fluid communication between the upper air plenum and the rear air plenum is provided by the configuration of the cover 266 and rear air plenum 246. Finally, as shown in FIG. 21, the motor cooling fan 262 may be enclosed within a duct 268 having a rear opening 270, which directs air from the motor cooling fan 262 out of the rear opening 270.

Figure 24:
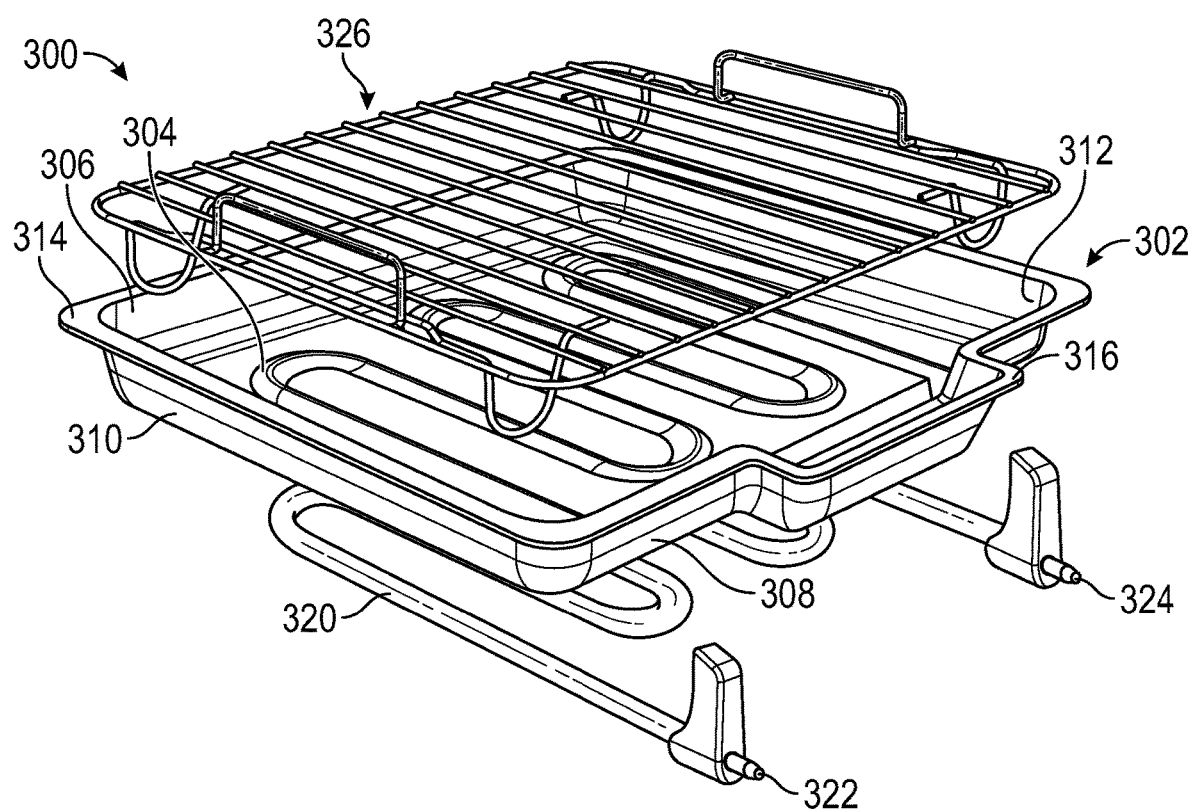
FIG. 24 is an exploded, perspective view of a power tray of the toaster oven of FIG. 15.
Figure 25:
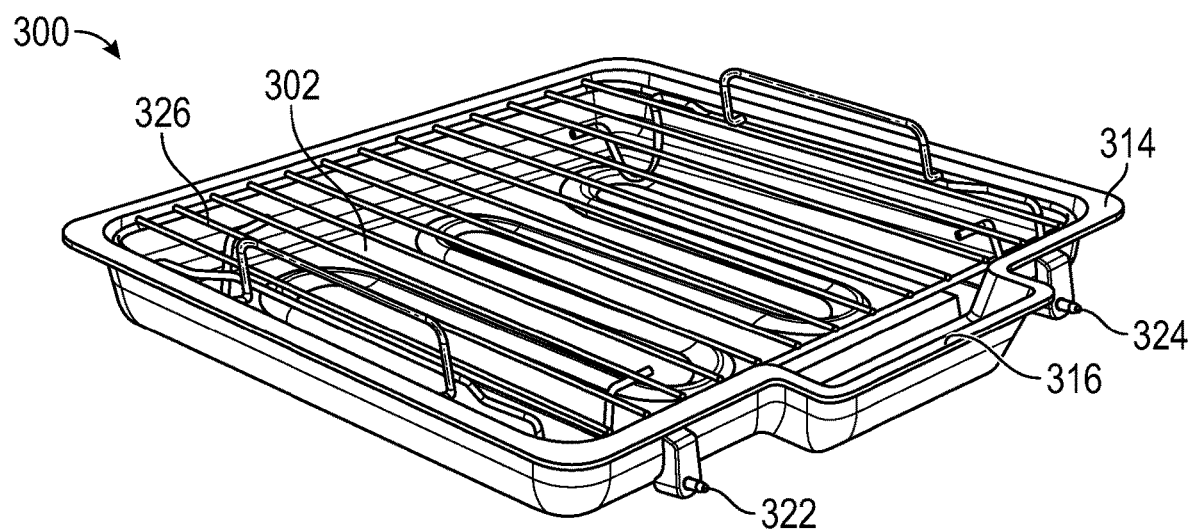
FIG. 25 is a perspective view of the power tray of FIG. 24.

Referring now to FIGS. 24 and 25, in an embodiment, the toaster oven 200 includes a power tray 300 that is configured to be received within the internal compartment 214. The power tray 300 is generally similar in configuration to power tray 100 and includes a tray 302 having a bottom surface 304, a front wall 306, a rear wall 308, opposed sidewalls 310, 312 extending upwardly from the bottom surface 104, and an upper flange 314 that extends around the periphery of the tray 102. The tray 302 further includes a rear scoop 316 that extends rearwardly from the rear wall 308.

As further shown in FIG. 24, the power tray 300 includes a heating element 320 having a pair of electrical contacts 322, 324 mounted to the underside surface of the tray 302. While the heating element 320 is illustrated as being mounted to the underside surface, it is contemplated that the heating element 320 may, alternatively, be embedded within the bottom surface 304 of the tray 302. In an embodiment, the heating element 320 has a serpentine or wave configuration. In an embodiment, the heating element 320 is a Calrod® heater, such as a stainless steel Calrod® heater, although any other type of heating element known in the art, such as quartz, infrared, tungsten, halogen, etc., may also be utilized without departing from the broader aspects of the present invention. The electrical contacts 322, 324 are configured to be received within the sockets 229 in the rear wall of the internal compartment 214 when the power tray 300 is positioned in the upper slots 248, so as to receive a supply of electrical power therefrom to power the heating element 320.

As further shown in FIGS. 24 and 25, in embodiment the power tray 300 may include a wire rack 326 receivable within the tray 302 for elevating food items above the bottom surface 304 of the tray 302 to allow for the passage of air therebeneath.

In use, the power tray 300 is receivable within the upper slots 248 formed in the sidewalls of the internal compartment. In particular, the flange 314 of the tray 102 is slidably received within the slots 248 such that the tray 300 is supported by the lower shoulder of the slots 248. As the tray 300 is pushed inwardly into the compartment, the leading edge of the scoop 316 contacts the upper damper 236 and pushes the damper open. In this position, fluid communication is provided between the rear air plenum 246 and the interior compartment 214. Moreover, the tray 300 can be pushed further into the compartment 214 until the electrical contacts 322, 324 are received within the corresponding sockets 229 in the rear wall of the compartment 214, providing the heating element 320 of the tray 300 with a supply of electrical power. When the tray 300 is removed, the electrical contacts 322, 324 are disengaged, interrupting the supply of electrical power to the heating element 320. This rearward movement of the tray 300 also causes the scoop 316 to disengage from its contact with the damper 236, allowing the torsion spring to rotate the damper 236 back to its closed position where the opening 232 is closed off (preventing fluid communication between the interior compartment 214 and the rear air plenum 246).

Figure 26:
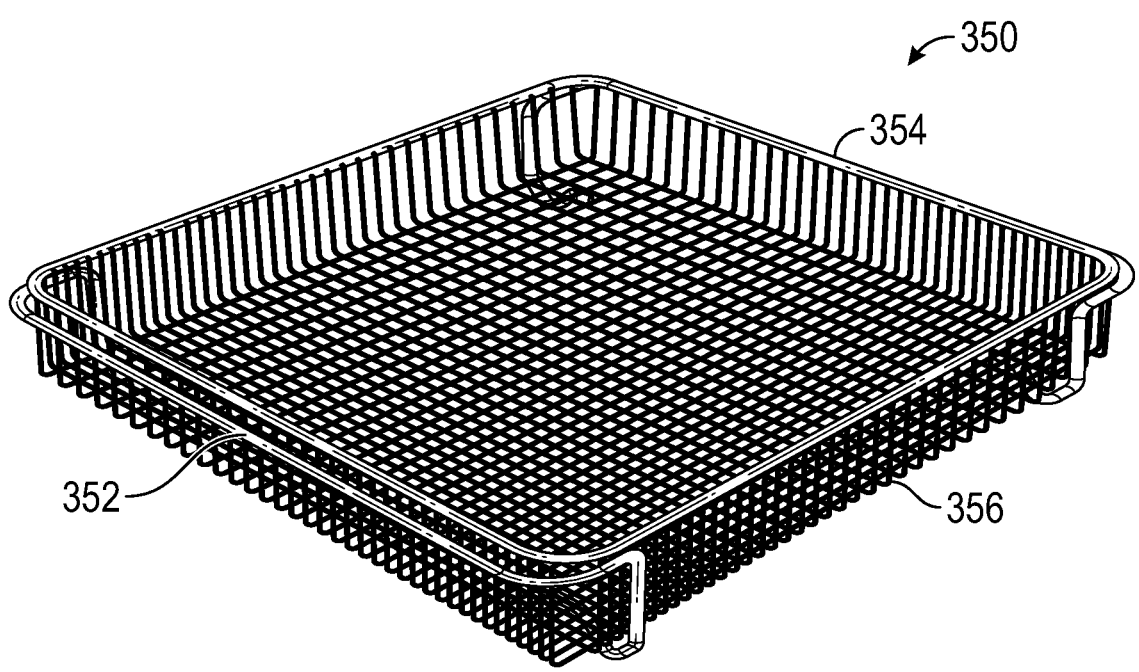
FIG. 26 is a perspective view of an air fry basket of the toaster oven of FIG. 15.

Turning now to FIG. 26, the toaster oven 200 also includes a frying rack or basket 350 similar to that described above. The frying basket 350 is generally rectangular in shape and is formed from a plurality of crisscrossing wire members which define therebetween a plurality of openings or apertures which allow for the free flow of air through the frying basket 150. As shown therein, the frying basket 350 includes opposed guide rails 352, 354 that extend between the front and the rear of the basket 350 along the upper edge thereof, as well as a forward projection or rail 356 that extends outward from the top, upper edge of the basket 350.

In use, the frying basket 350 is receivable within the upper or lower slots 248, 250 formed in the opposed sidewalls of the compartment 214. In particular, the opposed guide rails 352, 354 of the frying basket 350 are slidably received within the upper or lower slots 248 or 250 such that the basket 350 is supported by the lower shoulder of the slots 248 or 250. As the basket 350 is pushed inwardly into the compartment 214, forward projection 356 contacts the upper or lower damper 236, 238 and pushes the damper open. In this position, fluid communication is provided between the rear air plenum 246 and the interior compartment 214. When the basket 350 is removed, the forward projection disengages from contact with the damper 236, 238, as the case may be, allowing the torsion spring to rotate the damper 236 or 238 back to its closed position where the opening 232 or 234 is closed off (preventing fluid communication between the interior compartment 214 and the rear air plenum 246).

Figure 27:
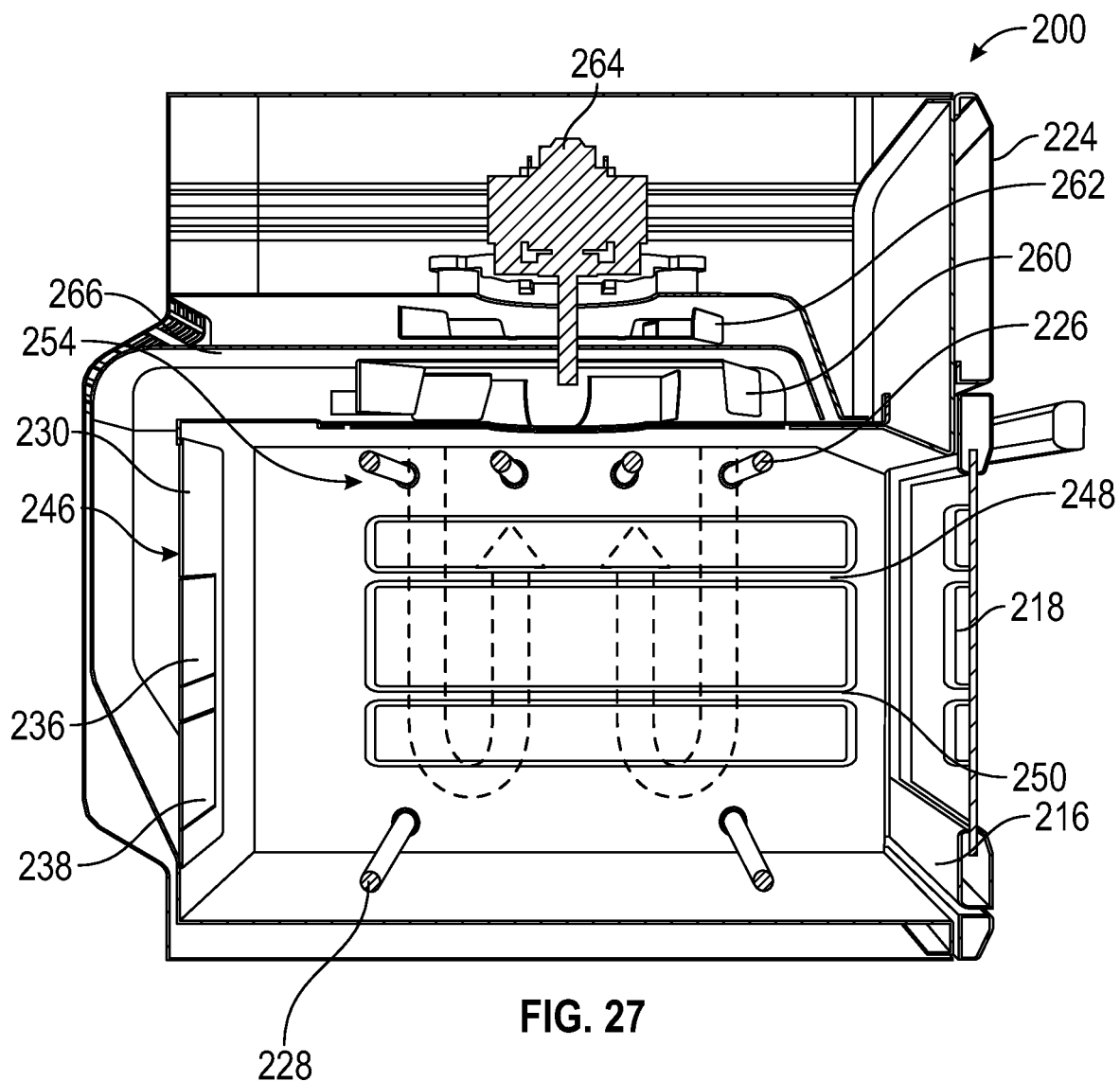
FIG. 27 is a side, cross-sectional view of the toaster oven of FIG. 15, illustrating an air circulation pathway when the rear vents are closed.

With reference to FIG. 27, when the rear vents are closed (i.e., when a tray 300 or basket 350 is not received in the upper or lower position to bias the dampers 236, 238 to their open positions), and the top vent 254 and damper 258 are open, the air generated by the impeller 260 circulates within the compartment 214 in the manner illustrated by the arrows. In particular, air is directed downwardly through the top vent 254 and circulated back out of the housing through the top vent 254 to provide standard convection cooking.

Figure 28:
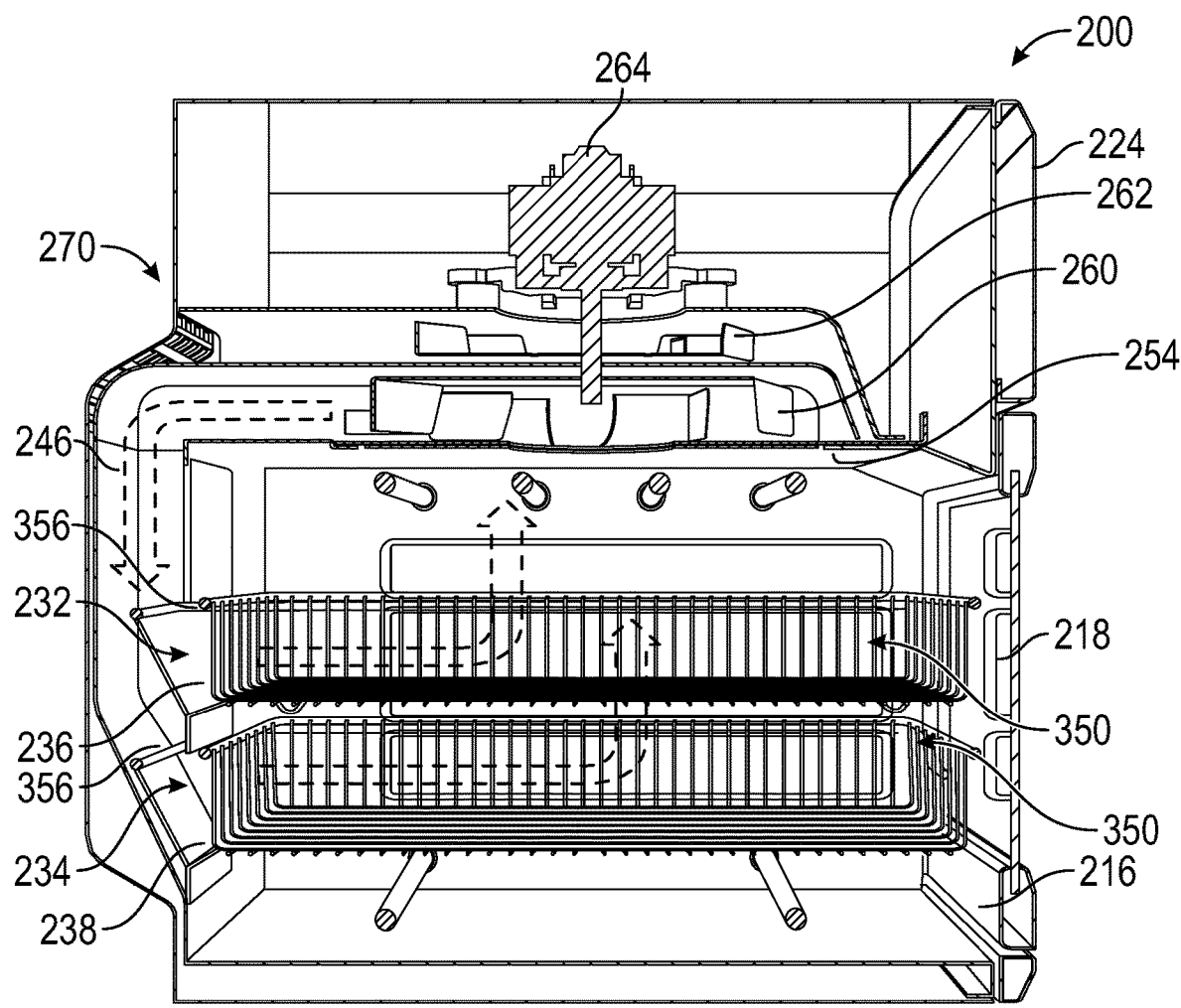
FIG. 28 is a side, cross-sectional view of the toaster oven of FIG. 15, illustrating an air circulation pathway when air fryer baskets are inserted and the rear vents are open.

With reference to FIG. 28, with two frying baskets 350 in place in the upper and lower slots 248, 250, dampers 236, 238 are moved against the spring bias to provide fluid communication between the interior compartment 214 and the rear air plenums 246 through the vent openings 232, 234 in the vent plates 30, 32. Air generated by the impeller 60 is circulated through the upper air plenum defined by the cover 66, into the side air plenums 46, and into the interior compartment 14 through the vent openings 38, 40. As illustrated, this hot air passes around food items received in the baskets 150.

Figure 29:
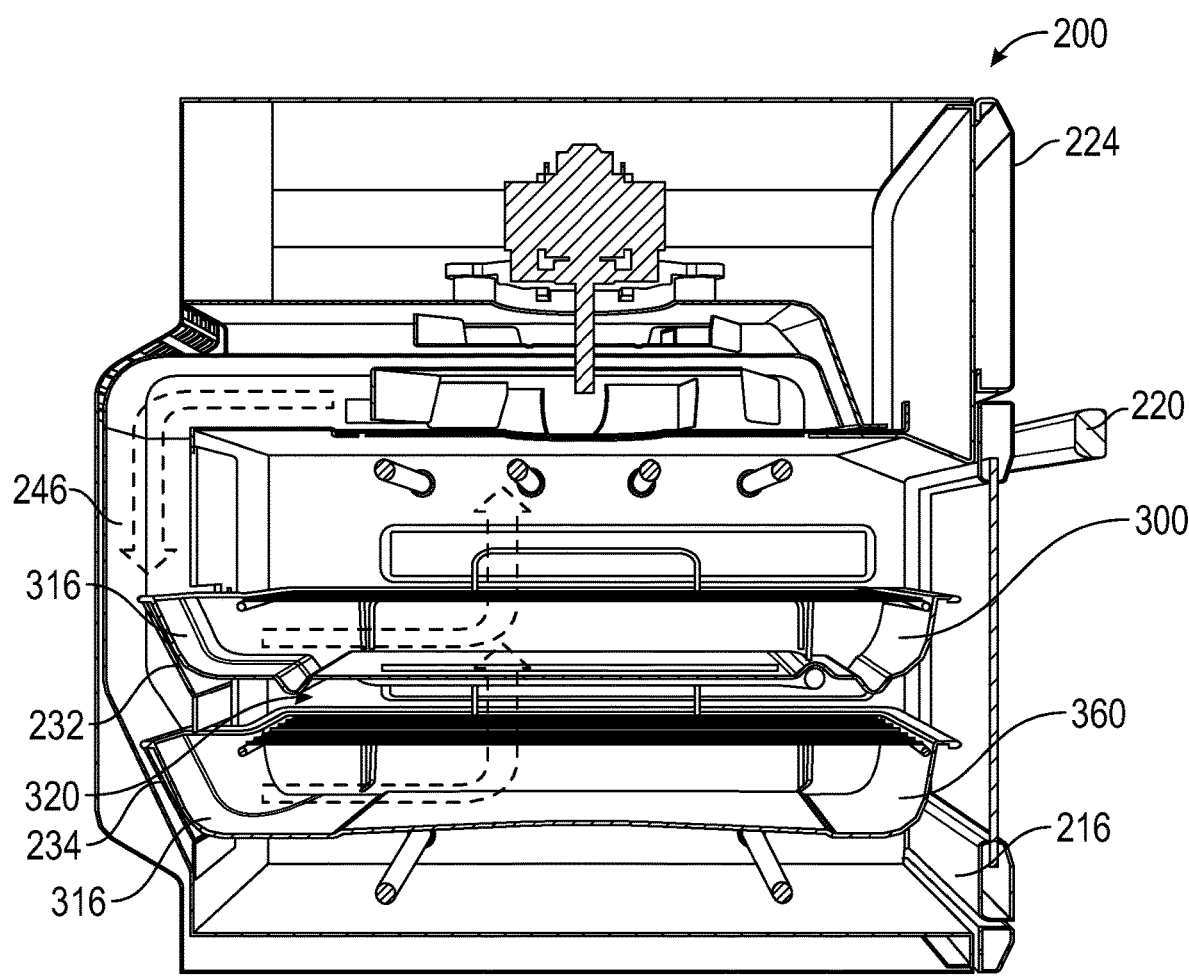
FIG. 29 is a front, cross-sectional view of the toaster oven of FIG. 15, illustrating an air circulation pathway when trays are inserted and the rear vents are open.

Turning now to FIG. 29, a power tray 300 is shown received in the upper slots 248, while a tray 360 (similar to power tray 300 but with no integral heating element) is shown received in the lower slots 250. As the trays 300, 360 are inserted, the dampers 236, 238 are moved against the spring bias to provide fluid communication between the interior compartment 214 and the rear air plenum 246 through the vent openings 232, 234 in the vent plate 230. Air generated by the impeller 260 is circulated through the upper air plenum defined by the cover 266, into the rear air plenum 246, and into the interior compartment 214 through the vent openings 232, 234. This air then passes into the trays 300, 360 through the open upper portion of the scoop 316 in the trays 300, 360. As illustrated, this hot air passes around food items received in the trays 300, 360. The heating element 320 of the upper, power tray 350 provides additional heat to warm or cook food items within the tray 350, as well as provides surface browning for food items received in the lower tray 360 (from above).

As disclosed above, standard trays without a forward scoop, when inserted, can be utilized with the toaster oven 200 as well, and as desired. Use of such trays will not open the vents in the rear of the compartment 214, allowing for even more customized and varied control over the specific air circulation paths and cooking functions.

As disclosed above, the multifunction toaster oven 200 of the present invention has variable venting and air paths that are controlled by selectively inserting specially configured baskets or trays that actuate spring-biased slider members to open vents in the sidewalls of the interior compartment. In this respect, the toaster oven 200 will automatically be configured to provide certain air flow routes in dependence upon whether or not trays or baskets are inserted in the interior compartment. Moreover, as disclosed herein, the toaster oven 200 includes a power tray 300 that is equipped with an embedded or attached heating element 320 for browning via the direct contact surface above it (to which it is embedded or attached) and/or broil or browning food on a tray or basket located beneath it. This level of cooking functionality has heretofore not been seen in the art. Still further, in contrast to existing devices which only accommodate a single tray, the toaster oven 200 of the present invention utilizes two trays or baskets, allowing for increased cooking capacity and/or the ability to carry out multiple different cooking functions simultaneously (e.g., convection cooking in an upper tray 300 and air frying and or broiling in a lower basket 350 or tray 360).

As also disclosed above, the ability to easily remove the vent panel 230 allows for easy cleaning of the vent panel 230, as well as easy access to and cleaning of the interior surfaces of the oven (including the rear air plenum 246).

Figure 30:
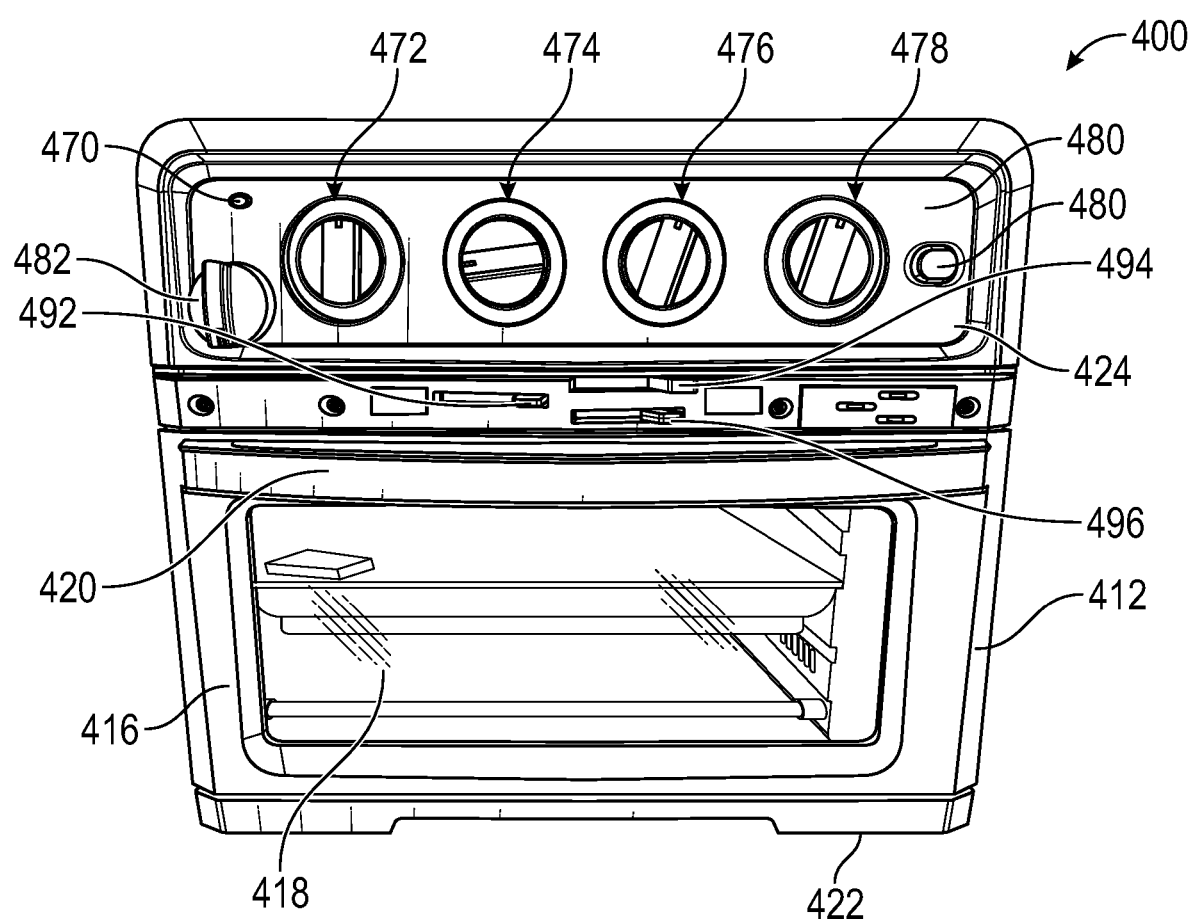
FIG. 30 is a front perspective view of a multifunction toaster oven according to another embodiment of the present invention.
Figure 31:
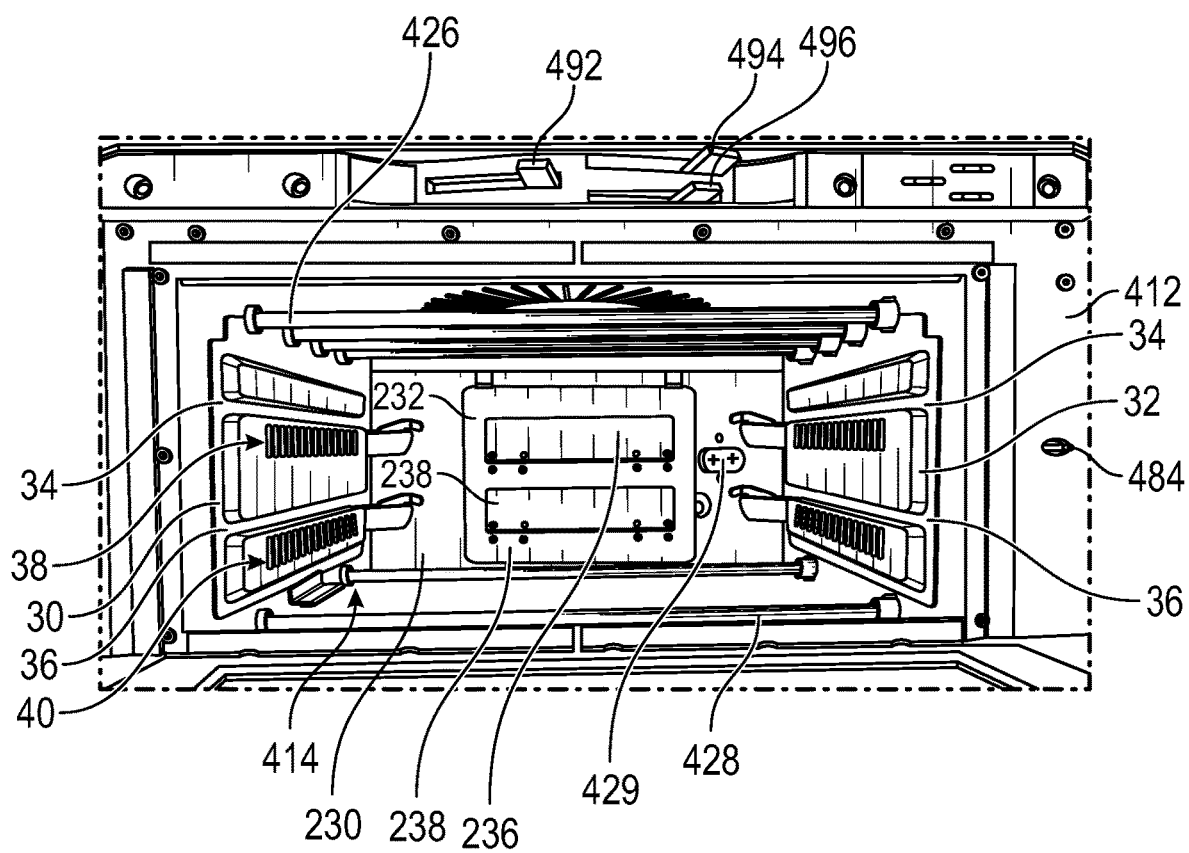
FIG. 31 is an enlarged, perspective view of the interior of the toaster oven of FIG. 30, illustrating side and rear vents thereof.

Referring now to FIGS. 30 and 31, a toaster oven 400 according to yet another embodiment of the present invention is illustrated. The toaster oven 400 is generally similar in configuration to toaster ovens 10 and 200 disclosed above, where like reference numerals designate like parts. Rather than having only side vents or rear vents, however, the toaster oven 400 has both side and rear vents (in addition to the standard top/upper vent below the impeller). In an embodiment, the side vents and rear vents, and the airflow passages/plenums that supply air from the impeller to the side and rear vents, may be constructed as illustrated herein and as disclosed above in connection with toaster oven 10 and toaster oven 200.

Similar to the embodiments of the invention described above, oven 400 includes a thermally insulated housing 412 that defines an internal heating compartment 414. The compartment 414 may be accessed through a door 416 having a transparent front panel 418. In an embodiment, the door 416 is pivotally connected to the housing 412 at a lower edge thereof. As shown therein, the door 416 also has a handle 420 allowing a user to open the door 416 to provide access to the compartment 414. A plurality of feet 222 support the housing 412 in spaced relation to a countertop or other surface. As further shown in FIG. 30, the front of the housing 412 includes a panel 424 forming a user interface (comprising, for example, a graphic display, such as a LCD, and an array of user controls, not shown, as discussed hereinafter).

As further shown in FIGS. 30 and 31, the toaster oven 400 includes one or more upper heating elements 426 positioned adjacent to a top surface of the internal compartment 414, and one or more lower heating elements 428 positioned adjacent to a bottom surface of the internal compartment 414. In an embodiment, the heating elements 426, 428 are Calrod® heaters, such as stainless steel Calrod® heaters, although any other type of heating element known in the art, such as quartz, infrared, tungsten, halogen, etc., may also be utilized without departing from the broader aspects of the present invention. The user interface 424 is electrically connected to, and configured to control, operation of the heating elements 426, 428. In particular, the user interface 424 includes a microprocessor (not shown) and control circuitry configured to control the heating elements 426, 428 in dependence upon a user input, and according to control algorithms stored in memory. In an embodiment, the upper and lower heating elements 426, 428 are independently controllable by the microprocessor and control circuitry. The back wall of the internal compartment 414 also includes one or more electrical contacts or sockets 429 for supping electrical power to an additional heat element associated with a cooking tray, as disclosed hereinafter.

Like the toaster oven 10, the opposing sides of the internal compartment 414 of toaster oven 400 include removable side vent panels 30, 32. The side vent panels 30, 32 each include upper and lower horizontally-extending slots 34, 36 that slidably receive baskets or trays that support food items during the cooking process, as described above. The vent panels 30, 32 additionally include a first, upper array of vent openings 38 beneath the upper slot 34, and a second, lower array of vent openings 40 beneath the lower slot 36, as well as upper and lower slider members 42, 44 slidably mounted to the panels 30, 32 behind the first and second array of vent openings 38, 40, respectively. As disclosed above in connection with toaster oven 10, the slider members 42, 44 each include an array of openings that generally correspond in size, shape and number to the upper and lower vent openings 38, 40, respectively. The slider members 42, 44 are mounted to the vent panels 30, 32 in such a manner that they are spring-biased to a position where the spaces between the openings in the slider members 42, 44 are aligned or in registration with the vent openings 38, 40 to close off the vent openings 38, 40 (referred to herein as a closed position of the vent openings 38, 40). In this position, fluid communication between an air plenum 46 behind the vent panels 30, 32 and the internal compartment 414 is prevented. The slider members 42, 44, however, are slidably moveable against the spring bias to a position where the openings in the slider members 42, 44 are aligned or in registration with the vent openings 38, 40, providing fluid communication between the air plenum 46 behind the vent panels 30, 32 and the internal compartment 14 (referred to herein as an open position of the vent openings 38, 40). In connection with the above, the slider member 42, 44 have an engagement member or foot 52 at the distal end thereof that extends laterally towards the interior of the compartment 414 and which is configured to be engaged by an inserted basket or tray to open the vents in the manner described above.

With further reference to FIGS. 30 and 31, and as indicated above, the rear wall of the internal compartment 14 of the toaster oven 400 includes a removable vent panel 230. As best shown in FIGS. 16, the vent panel 230 includes upper and lower vent openings 232, 234, and upper and lower dampers 236, 238 that are pivotably or hingedly mounted in the openings 232, 234, respectively. For example, in an embodiment, the dampers 236, 238 may be pivotally connected to the vent panel 230 via opposed mounting pins along the lower edges of the vent openings 232, 234, as disclosed above. In the preferred embodiment, torsion springs provide a rotational biasing force on the dampers 236, 238 that spring-biases the dampers 236, 238 to a closed position where the dampers 236, 238 extend across the vent openings 232, 234, in the manner described above. In this position, fluid communication between a rear air plenum behind the vent panel 230 and the internal compartment 414 is prevented (referred to as a closed position of the vent). The dampers 236, 238, however, are pivotably or rotationally moveable against the bias of the torsion spring to a position where the dampers 236, 238 do not extend across the openings 232, 234, allowing for fluid communication between the rear air plenum and the internal compartment 414 (referred to as an open position of the vent).

Figure 32:
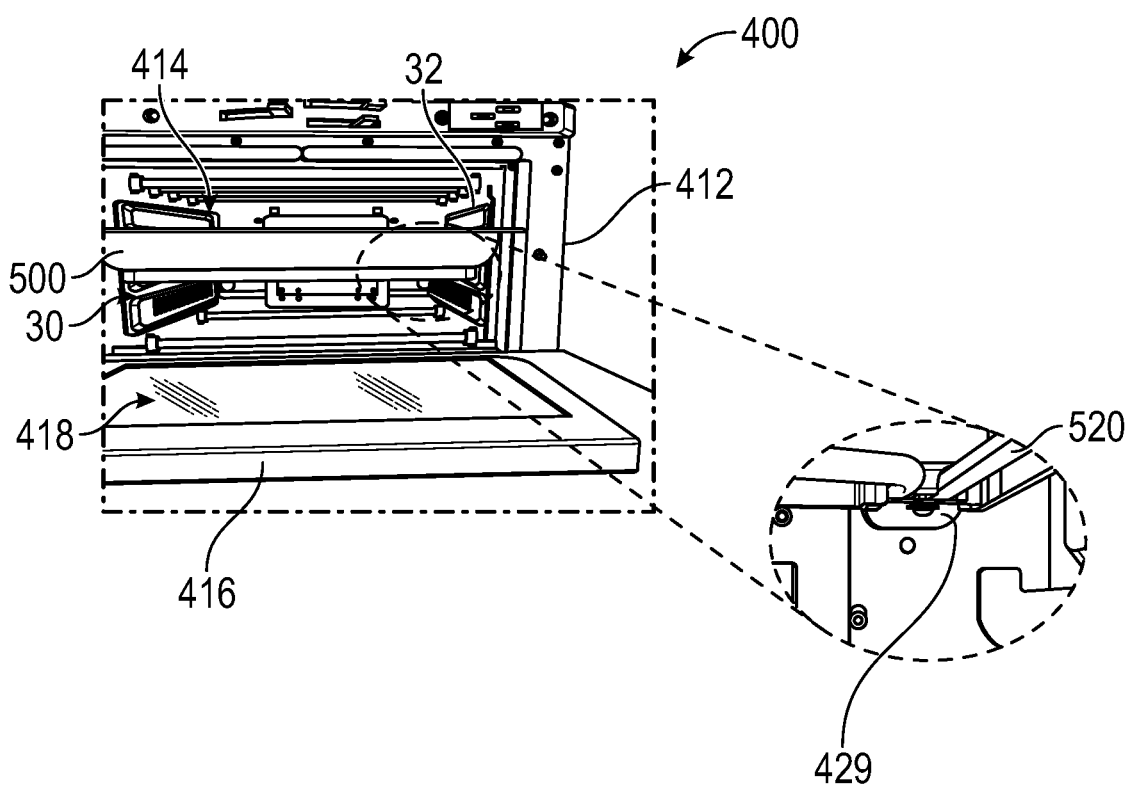
FIG. 32 is an enlarged, perspective view of the interior of the toaster oven of FIG. 30, illustrating insertion of a power tray.

FIG. 32 illustrates a power tray 500 slidably received in the upper slots 34 of the side vent panels 30, 32, with the connector 322 of the integrated/embedded heating element 520 of the power tray 500 received in the socket 429 and receiving power therefrom.

Figure 33:
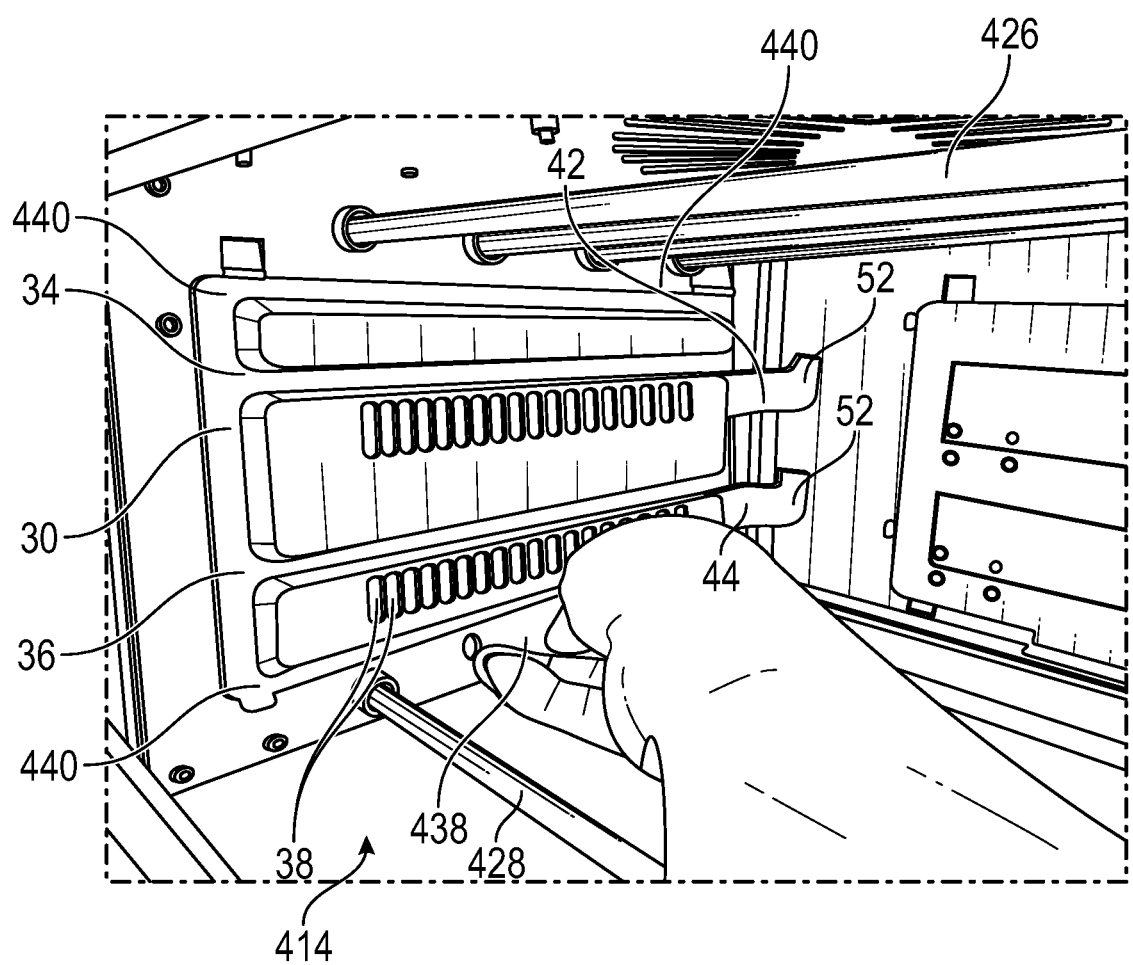
FIG. 33 is an enlarged, perspective view of the interior of the toaster oven of FIG. 30, illustrating removal of a side vent.
Figure 34:
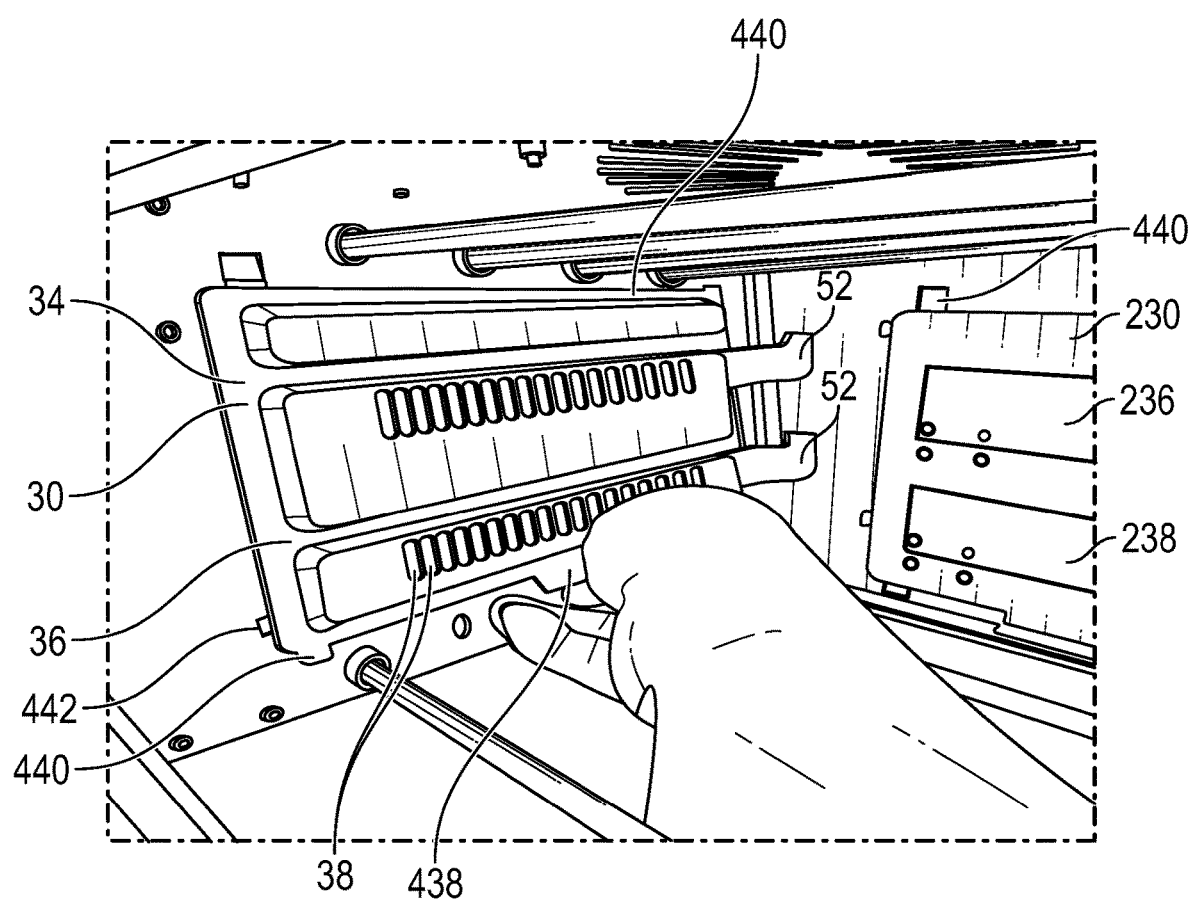
FIG. 34 is another enlarged, perspective view of the interior of the toaster oven of FIG. 30, illustrating removal of a side vent.
Figure 35:
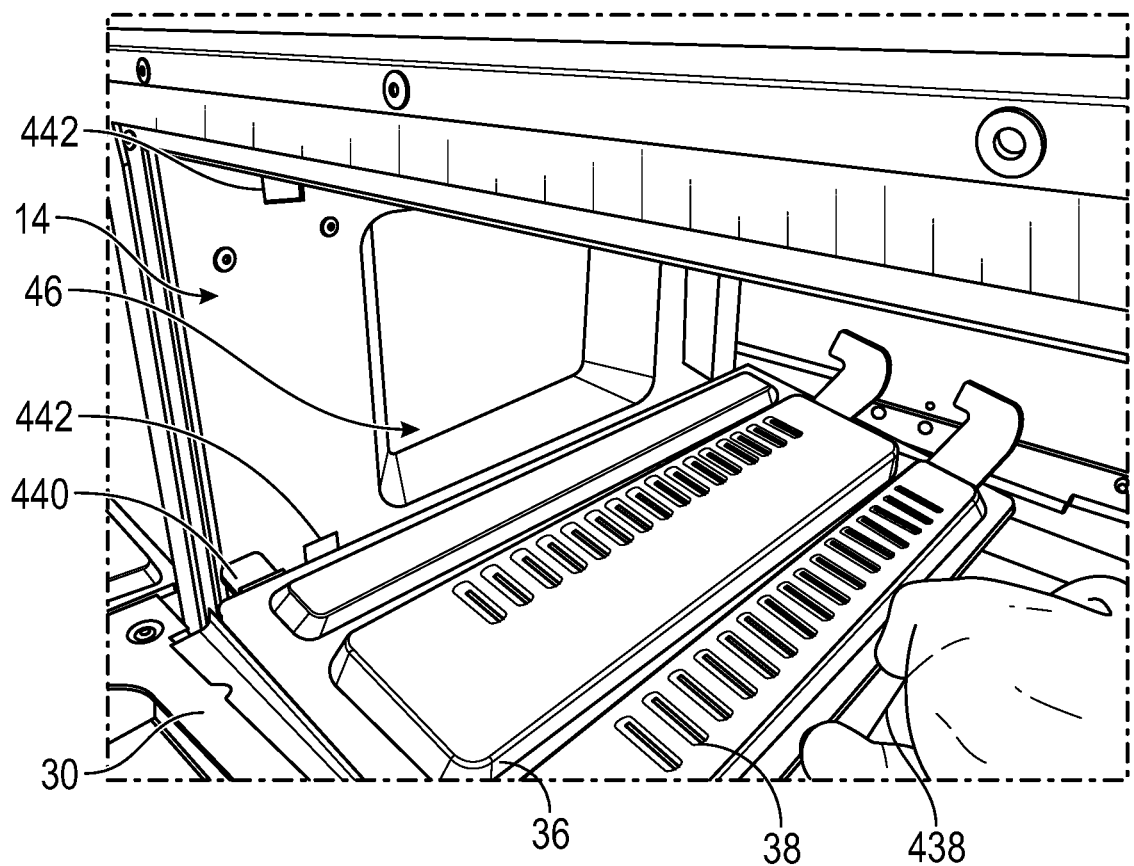
FIG. 35 is another enlarged, perspective view of the interior of the toaster oven of FIG. 30, illustrating removal of a side vent.

FIGS. 33-35 illustrate removal of the side vent panels 30, 32 for cleaning or servicing of the vent panels 30, 32 and side air plenums 46. As shown therein to remove any of the vent panels 30, 32, 230, a user lifts up on the lower tab 438 of the panel, and the lower edge is rotated towards the center of the internal compartment 414 to disengage lower tabs 440 from corresponding slots 442 in the walls of the internal compartment. Pulling down on the panel causes tabs 440 on the upper edge of the panel to disengage from corresponding slots 442 in the walls of the internal compartment 414, allowing the panel to be removed from the internal compartment 414. As noted above, each of the vent panels 30, 32, 230 may be similarly configured for easy removal and reinstallation. While a tab and slot connection is illustrated in FIGS. 33-35, it is contemplated that other coupling means such as screws and the like may also be utilized without departing from the broader aspects of the invention.

Figure 36:
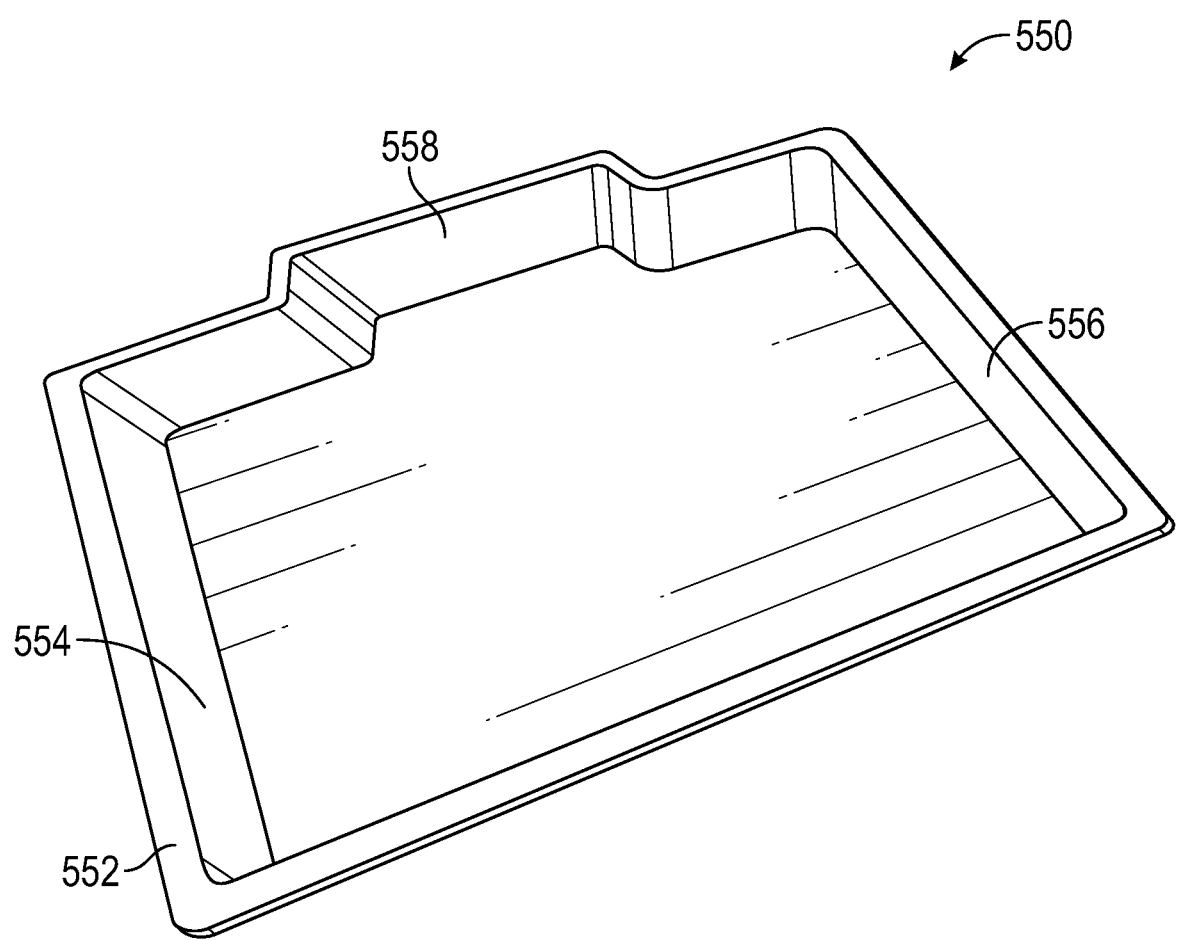
FIG. 36 is a top perspective view of a cooking tray of the toaster oven of FIG. 30.
Figure 37:
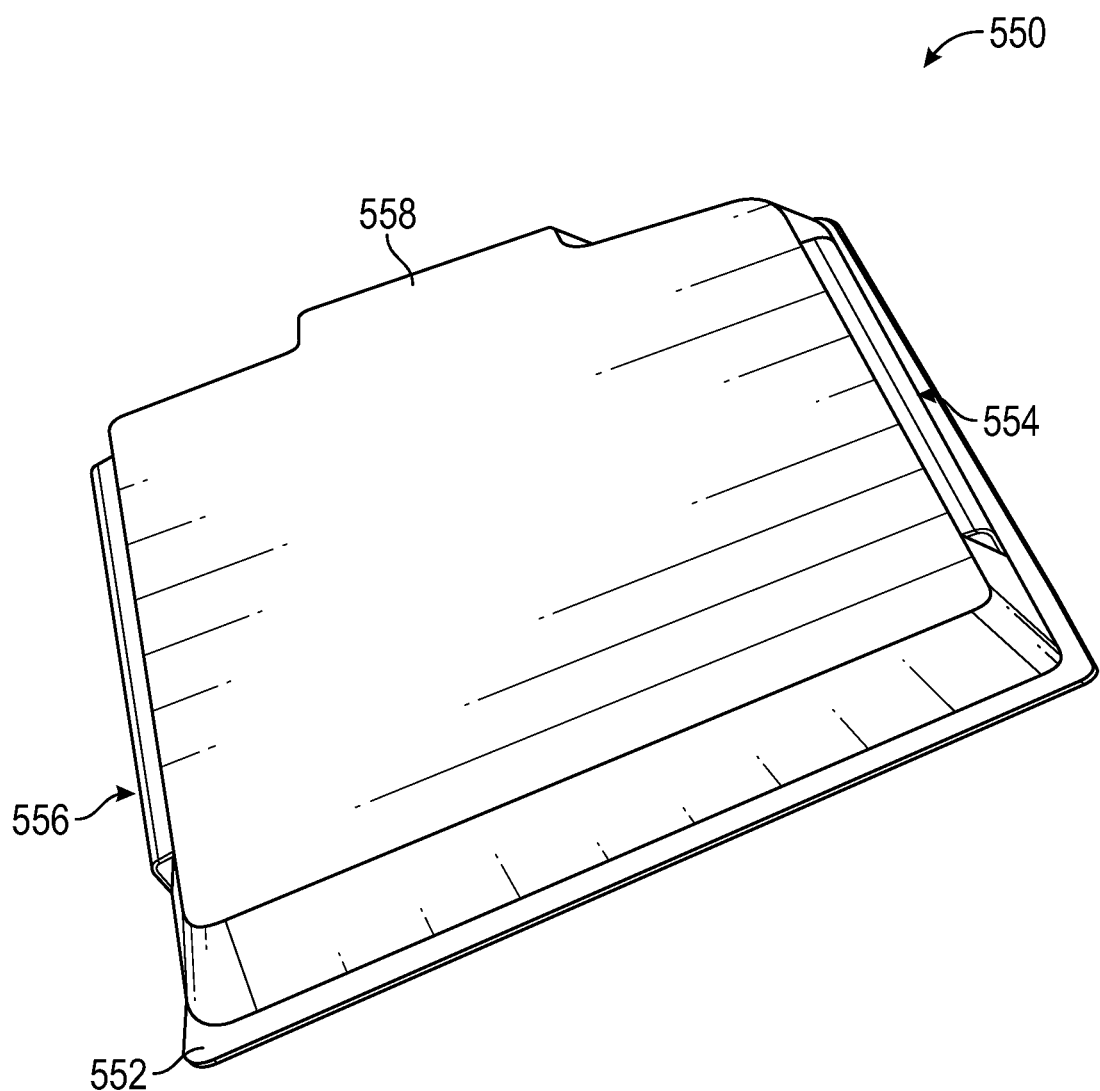
FIG. 37 it a bottom perspective view the cooking tray of FIG. 36.

With reference to FIGS. 36 and 37, a baking tray 550 for use with the toaster oven 400 is illustrated. The tray 500 is generally similar to those described above, and includes an upper flange 552 for slidably inserting the tray 500 in the internal compartment 414 via upper or lower slots 34, 36 of the side vent panels 30, 32, and for contacting the feet 52 of the slider members 42, 44 to open the side vents to allow airflow from the side air plenums 46 into the interior compartment 414. In connection with this, the tray also includes vent openings 554, 556 formed in the lateral sides of the tray 550, which align with the upper and lower vent openings 38 (depending on location of the tray) to allow for the passage of air into the tray 550, as described above. As best shown in FIG. 36, the tray 550 further includes a front scoop 558 that functions to push open the dampers 236, 238 of the rear vent panel 230 when the tray 550 is inserted, to allow for airflow through the rear plenum and into the interior compartment 414 and baking tray 550.

As indicated above, in an embodiment, standard baking trays that are devoid of features for actuating the side and rear vents may also be utilized with the toaster oven 400.

Figure 38:
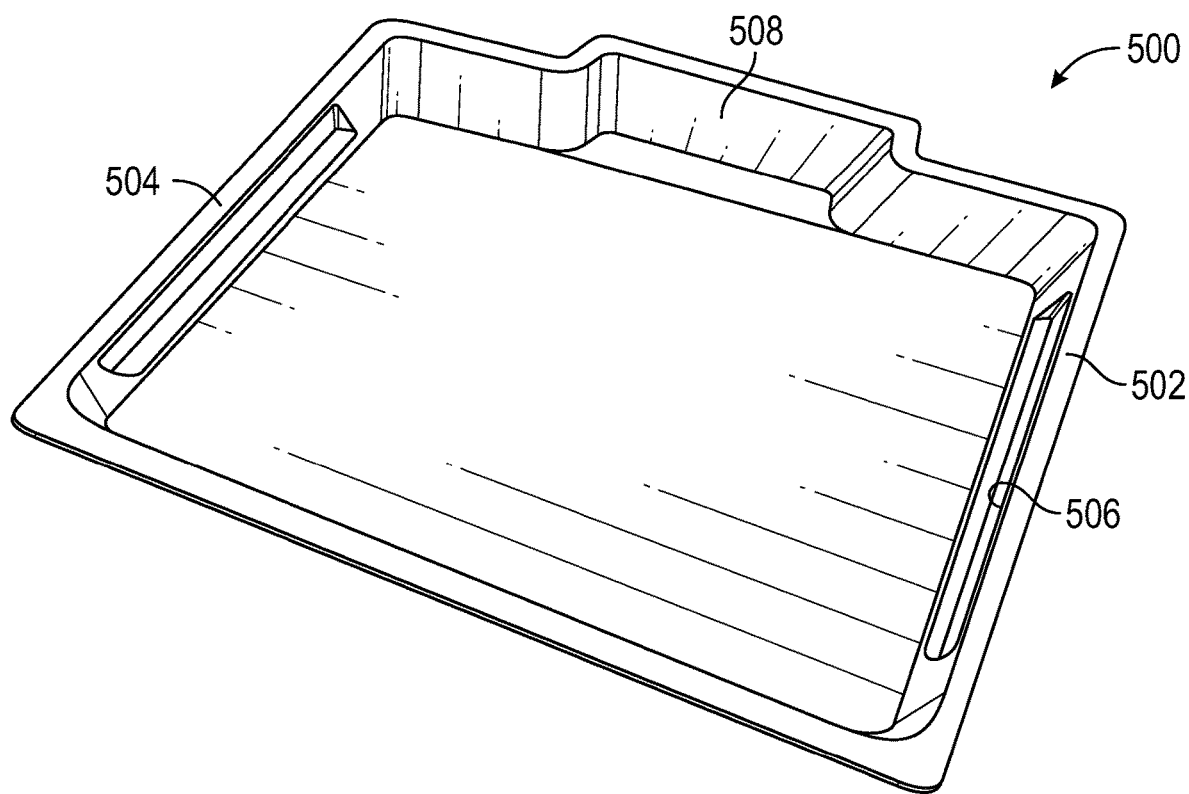
FIG. 38 is a top perspective view of a power tray of the toaster oven of FIG. 30.
Figure 39:
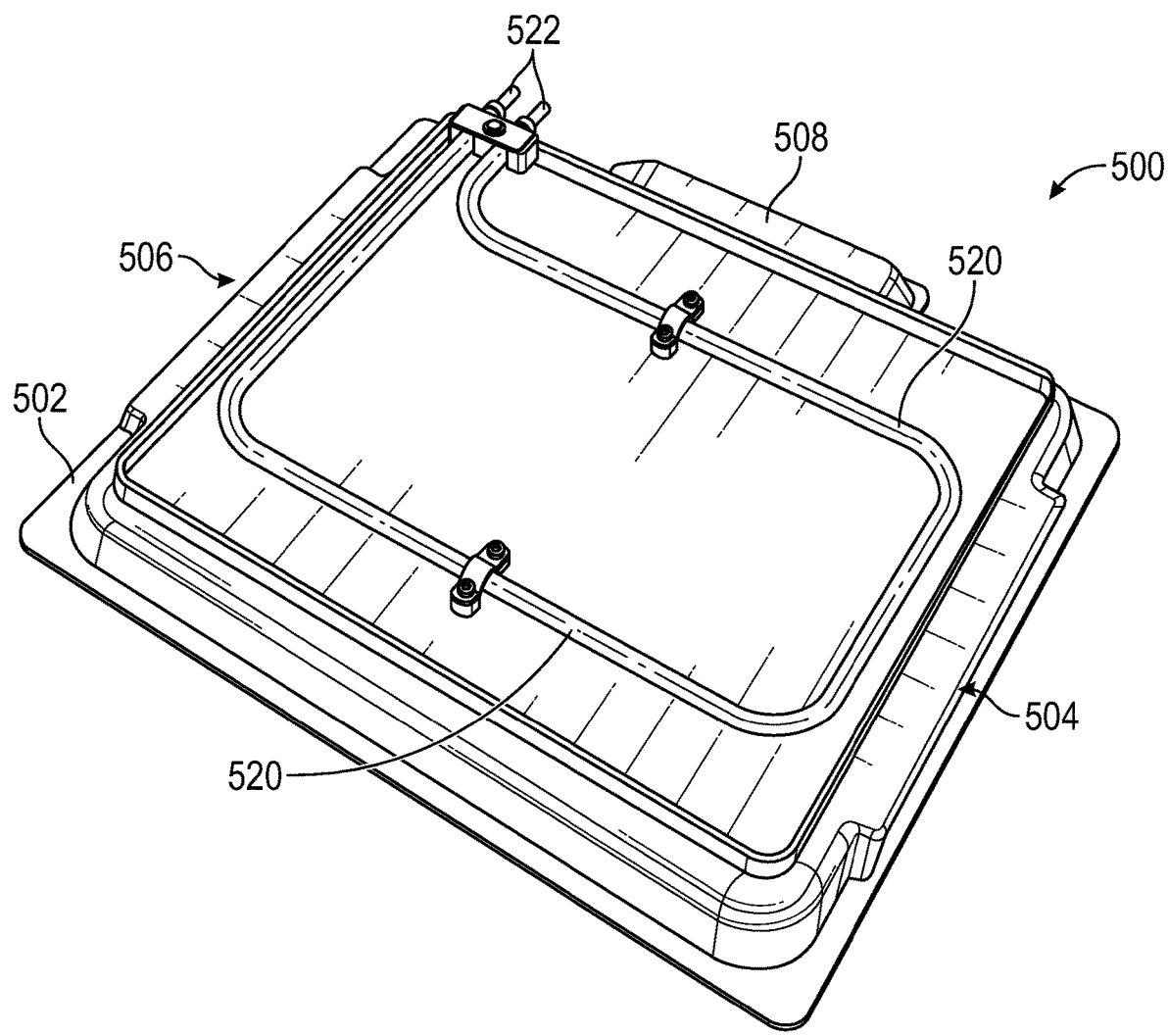
FIG. 39 it a bottom perspective view the power tray of FIG. 38.

Referring to FIGS. 38 and 39, a power tray 500 for use with the toaster oven 400 is illustrated. The power tray 500 is substantially similar to tray 550, and includes an upper flange 502 for slidably mounting the tray 500 in the interior compartment 414, and for opening the side vents, as disclosed above. As with the tray 550, tray 500 includes vent openings 504, 506 formed in the lateral sides of the tray 550, which align with the upper and lower vent openings 38 (depending on location of the tray) to allow for the passage of air into the tray 550, as described above. As best shown in FIG. 38, the power tray 500 further includes a front scoop 508 that functions to push open the dampers 236, 238 of the rear vent panel 230 when the tray 500 is inserted, to allow for airflow through the rear plenum and into the interior compartment 414 and baking tray 500. As also shown therein, the power tray 500 includes an embedded or connected heating element 520, for the purpose described above.

Operation of the toaster oven 400 is substantially similar to the embodiments described above, except that when the side and rear vents are open, airflow is provided into the interior compartment from the sides and rear (as opposed to just the sides or just the rear). As will be appreciated, this ensures that airflow is reaching the food items within the interior compartment from almost all directions, ensuring even cooking.

Referring back to FIG. 30, the toaster oven 400 is operable in a large variety of cooking modes and capable of carrying out a wide variety of cooking functions. In connection with this, the control interface 424 includes a plurality of knobs or buttons for controlling operation of the toaster oven 400. For example, the control interface 424 includes a power on indicator light 470, a knob 472 for selecting a cooking time (i.e., a duration of activation of the upper and lower heating elements 426, 428), a knob 474 for selecting a cooking temperature (i.e., for varying the wattage of the upper and lower heating elements 426, 428), a cooking function selector dial 476, and a toast timer/shade selector knob 478. In an embodiment, the cooking function selector dial 476 may be utilized to select one of a variety of cooking functions such as, for example, warm, broil, toast, bake, convection bake and air fry. The control interface 424 may also include a button 480 for turning on and off an internal light. In an embodiment, the control interface 424 may also include a dial or knob 482 to selectively controlling a temperature of the power tray 500 and embedded/connected heating element 520 thereof. In an embodiment, the heating element 520 may be thermostatically controlled using the knob 482.

In an embodiment, the toaster ovens 10, 200, 400 described herein include two thermistors, a first thermistor that controls the primary temperature of the toaster oven (by controlling the upper and lower heating elements within the internal heating compartment), and a second thermistor that controls the temperature of the heating element of the power tray, when utilized. The toaster ovens disclosed herein may also include a door switch 484 that is configured to disconnect power from the heating elements (internal heating elements and power tray heating element) when the door is open.

In an embodiment, in bake, broil and toast modes, the top vent, side vents and rear vents are closed. In convection bake and broil modes, the top vent is open and the side vents and rear vent may be closed. In an air fry mode using side venting, the side vents are open and the top vent is open, while the rear vent is closed. In an air fry mode using rear venting, the rear vent and top vent are open while the side vents are closed. In an air fry mode using full venting, the top vent, side vents and rear vent are open.

In any of the embodiments disclosed herein, in addition to, or alternative to, providing for automatic (i.e., tray-activated) opening of the vents (e.g., side vents and rear vents) when a tray is inserted into the upper and/or lower slots via engagement of the tray(s) with the vents, it is also envisioned that the toaster ovens may include a plurality of manual levers, buttons or other control means for effecting a manual opening and/or closing of the various vent openings. For example, as illustrated in FIGS. 30 and 31, in an embodiment, the control interface may include a plurality of levers 492, 494, 496 for selectively opening and closing the side, rear and top vents, respectively. In an embodiment, the levers 492, 494, 496 may be mechanically connected to the vents such that actuation of the levers causes the vents to open or close. For example, actuation of lever 494 may be used to control the position (open or closed) of the opposed vents associated with both the upper tray and lower tray positions. In another embodiment, dedicated, separate levers or other mechanism may be provided to control the position of the opposed vents associated with the upper tray position, and the position of the opposed vents associate with the lower tray position, respectively. In still further embodiments, each array of vent openings may have a dedicated control means allowing, for example, individual control over each vent (e.g., the left side, upper vent, the right side, lower vent, etc.).

In yet other embodiments, the levers may be connected to a control unit, such that moving of the levers signals to the control unit to open or close the vent(s) via an actuator (e.g., an electronic actuator or solenoid or other motor-driven actuator) associated with each of the vents. While FIGS. 30 and 31 illustrate levers for manually controlling the position of the vents, it is envisioned that any type of input or control means can be utilized to signal to the control unit to open or close the vents (depending on a position of the input/control means). For example, a plurality of buttons, knobs, switches or the like may be employed.

The provision of a manually actuatable control mechanism for selectively moving the various vent openings between open and closed position provides greater flexibility and expanded control over operation of the toaster oven and its various cooking modes. For example, levers 492, 494, 496 allow a user to open one or more of the side vents, as desired, even when standard trays (not having features for moving the vents to the open position when the trays are received within the toaster oven) are utilized. In addition, levers 492, 494, 496 allow the various vents to be opened even when no tray is present. As indicated above, the manual vent control means may be provided in addition to, or alternative to, the automatic opening of the vents via the tray engagement features disclosed above. While it has been disclosed above that a plurality of levers may be utilized to control the position of each vent (or pair of side vents) it is contemplated that a single lever or other control means may be provided to control the position of all the vents, together.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A toaster oven, comprising:
    a housing having an internal heating compartment including a top wall, a bottom wall, a back wall, a pair of opposing sidewalls, and an air plenum in a side of the housing;
    at least one heating element within the internal heating compartment;
    a plurality of side vent openings providing fluid communication between the air plenum and the internal heating compartment; and
    at least one slider member having an array of slider vent openings, the at least one slider member being slidably moveable in a horizontal direction between a first position where the array of slider vent openings in the at least one slider member is offset relative to the plurality of side vent openings to prevent fluid communication between the air plenum and the internal heating compartment, and a secondposition where the array of slider vent openings are aligned with the plurality of side ventopenings to provide fluid communication between the air plenum and the internal heating compartment,
    wherein the at least one slider member includes a foot with a lateral portion that extends toward an inner cavity portion of the internal heating component, the lateral portion of the foot being engageable by a food support tray upon insertion of the food support tray into the internal heating compartment and movement of the food support tray in the horizontal direction, whereby horizontal movement of the food support tray in the horizontal direction causes a corresponding horizontal movement of the foot to move the at least one slider member to the second position;

wherein a removal of the food support tray from the internal heating compartment relaxes a biasing force exerted on the at least one slider member such that the at least one slider member moves from the second position to the first position.

2. The toaster oven of claim 1, further comprising:
at least one side vent panel, the plurality of side vent openings being formed in the at least one side vent panel;
wherein the at least one side vent panel includes at least one horizontally-extending slot, and
the plurality of side vent openings includes an array of side vent openings vertically spaced beneath the at least one slot.

3. The toaster oven of claim 2, wherein:
the at least one slot includes a pair of slots, each slot of the pair of slots being configured to receive a food support tray, such that a pair of food support trays are receivable in stacked vertical relationship within the internal heating compartment;
wherein the side vent openings of the array are located beneath each slot of the pair of slots.

4. The toaster oven of claim 2, wherein:
the at least one side vent panel and the at least one slider member are removable from the internal heating compartment.

5. The toaster oven of claim 1 wherein:
the at least one slider member is spring-biased to the first position.

6. The toaster oven of claim 5, wherein:
the foot is located at a distal end of the at least one slider member adjacent the back wall of the internal heating component.

7. The toaster oven of claim 1, further comprising:
a top vent located about the top wall of the internal heating compartment.

8. The toaster oven of claim 1, further comprising:
at least one rear vent opening located in the back wall of the internal heating compartment.

9. The toaster oven of claim 8, wherein:
the at least one rear vent opening includes a damper pivotally mounted within the at least one rear vent opening;
wherein the damper is moveable between a first position where the at least one rear vent opening is closed off by the damper to prevent fluid communication between an air plenum in a back of the housing and the internal heating compartment, and a second position where the damper is pivoted away from the at least one rear vent opening to provide fluid communication between the air plenum and the internal heating compartment.

10. The toaster oven of claim 9, wherein:
the damper is spring biased to the first position.

11. The toaster oven of claim 9, wherein:
the at least one rear vent opening comprises a pair of rear vent openings vertically spaced with respect to one another, each rear vent opening having an associated damper.

12. The toaster oven of claim 9, wherein insertion of the food support tray in the internal heating compartment pushes the damper to the second position such that the at least one rear vent opening is open to provide fluid communication between the air plenum in the back of the housing and the internal heating compartment, and removal of the food support tray from the internal heating compartment biases the damper to the first position to close off the at least one rear vent opening and prevent fluid communication between the air plenum in the back of the housing and the internal heating compartment.

13. The toaster oven of claim 1, further comprising:
a control interface having at least one of a lever, a button and a knob for manually moving the at least one slider member between the first position and the second position.

14. The toaster of claim 1, wherein:
the food support tray has a bottom panel, a front wall, a rear wall and a pair of opposed sidewalls, the bottom panel, front wall and rear wall being devoid of openings therethrough, and each of the sidewalls having an opening allowing airflow from the side vent openings to enter the food support tray.

\* \* \* \* \*